(12) United States Patent
Keane et al.

(10) Patent No.: US 6,725,954 B1
(45) Date of Patent: Apr. 27, 2004

(54) APPARATUS AND METHOD FOR STEERING A VEHICLE WITH ZERO TURNING RADIUS CAPABILITY

(75) Inventors: James C. Keane, Chapel Hill, NC (US); Brian C. Doklovic, Hillsborough, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/402,575

(22) Filed: Mar. 28, 2003

(51) Int. Cl.[7] .............................................. B62D 11/08
(52) U.S. Cl. ..................................................... 180/6.48
(58) Field of Search .................................. 180/6.2, 6.48

(56) References Cited

U.S. PATENT DOCUMENTS

| | | | | |
|---|---|---|---|---|
| 3,743,043 A | * | 7/1973 | Gelinas | 180/6.2 |
| 5,021,037 A | * | 6/1991 | Tervola | 475/25 |
| 5,850,886 A | | 12/1998 | Kouno et al. | |
| 6,543,548 B1 | * | 4/2003 | Ichikawa et al. | 172/49 |

\* cited by examiner

*Primary Examiner*—Kevin Hurley
(74) *Attorney, Agent, or Firm*—Jenkins, Wilson & Taylor, P.A.

(57) ABSTRACT

An apparatus and method for steering a vehicle with zero turning radius capability includes a movable steering handle, first and second CVT devices for independently driving first and second drive wheels, respectively, a transmission control device, and first and second biased guide members. The transmission control device interconnects the steering handle and the first and second CVT devices, and includes a mixing lever for controlling operations of the first and second CVT devices. Movement of the steering handle in a first steering direction causes the first guide member to move the mixing lever in a first actuating direction, and movement of the steering handle in a second steering direction causes the second guide member to move the mixing lever in a second actuating direction. The mixing lever can be positioned so as to cause the first and second CVT devices to drive the drive wheels in a manner permitting the vehicle to be steered at a zero turn radius in response to movement of the steering handle in a selected steering direction.

57 Claims, 32 Drawing Sheets

APPARATUS AND METHOD FOR STEERING A VEHICLE WITH ZERO TURNING RADIUS CAPABILITY

TECHNICAL FIELD

The present invention generally relates to a steering control apparatus and method for a vehicle having a continuously variable transmission. More particularly, present invention relates to a steering control device or system in which a steering wheel and a transmission operating device can combine to control a pair of left and right continuously variable transmissions such that the vehicle has zero turning radius (ZTR) capability.

BACKGROUND ART

Many types of vehicles, and particularly utility vehicles such as lawnmowers, tractors and the like, are steered to the left and right through the operation of independently controlled drive wheels. For instance, to turn such a vehicle to the left, the left drive wheel can be slowed relative to the right drive wheel such that the greater percentage of torque produced by the vehicle's motor is transmitted to the right drive wheel. One popular technique for independently controlling the drive wheels is to employ a transmission system in which separate continuously variable transmission (CVT) devices respectively control each drive wheel. The CVT devices are typically controlled by a pair of hand-operated levers, foot-operated pedals, or the like. In addition to transmission-controlled steering systems, these types of vehicles can also rely on their steering wheels to turn non-driven wheels in a conventional manner. Recently, some of these vehicles are capable of executing zero radius turns to provide greater maneuverability.

In commonly assigned U.S. Pat. No. 5,850,886 to Kuono et al., the content of which is incorporated herein in its entirety, a vehicle equipped with a useful CVT-controlled steering system is disclosed. The vehicle includes a steering wheel linked to a pair of non-driven front wheels, and a pair of rear drive wheels controlled by a corresponding pair of CVT devices. The steering wheel not only controls the non-driven front wheels, but also controls the CVT devices and thus the rear drive wheels through a pair of cables such as Bowden wires that actuate a transmission control system. The ability to control the CVT devices by means of the steering wheel is highly advantageous in the mass consumer market, because the steering wheel constitutes a steering control interface with which consumers are generally familiar and comfortable.

While the steering wheel-controlled transmission system disclosed in U.S. Pat. No. 5,850,886 is advantageous, it is not designed to provide its vehicle with zero turn radius capability. It would therefore be advantageous to provide an apparatus and method for steering a vehicle using a steering wheel controlled transmission system, and also provide the apparatus with the ability to steer the vehicle at a zero turn radius.

SUMMARY

The present invention in general terms provides an apparatus and method for steering a vehicle with zero turning radius capability. The invention is particularly advantageous as applied to a riding-type vehicle, such as a lawnmower, tractor, or other utility vehicle having at least a pair of left and right drive wheels and one or more non-driven wheels.

The apparatus generally comprises a steering handle such as a steering wheel, a transmission control device, and a pair of continuously variable transmission devices. The steering handle and transmission control device are intercoupled through a suitable steering linkage assembly, which preferably includes a pair of cables such as Bowden wires. The steering handle preferably is not linked to any wheels of the vehicle, such that the vehicle is turned solely by means of the interactive operation of the steering handle, the transmission control device, and the continuously variable transmission devices. Preferably, in addition to the drive wheels, the vehicle comprises one or more non-driven wheels that are provided as caster wheels. The caster wheels swivel freely in response to turning of the vehicle, and independently of the operation of the steering handle. The caster wheels advantageously facilitate the steering of the vehicle at a zero turn radius. The zero turn radius capability of the vehicle is described in detail hereinbelow.

By moving the steering handle in a desired direction, such as by turning a steering wheel, one of the cables of the steering linkage assembly actuates certain components of the transmission control device in a manner that adjusts the respective states of the continuously variable transmission devices. Each continuously variable transmission device controls an individual drive wheel of the vehicle and, more specifically, controls the angular velocity of each drive wheel in terms of both rotational speed and direction (forward or reverse) of rotation. Thus, for instance, if the steering handle is turned to the left while the vehicle is being driven forwardly, the transmission control device is actuated so as to cause one of the continuously variable transmission devices to drive the right drive wheel at a relatively fast speed in the forward direction, while the other continuously variable transmission device drives the left drive wheel either at a slower forward speed, at a zero speed (i.e., a neutral state of the left drive wheel), or even at a reverse speed. The vehicle is turned or steered as a result of the differential angular velocities of the drive wheels. In the case of driving the left drive wheel at a reverse speed while driving the right drive wheel at a forward speed, the left and right drive wheels are accordingly driven in different directions, thereby enabling the vehicle to be turned to the left (or to the right by analogy) at a zero turn radius while moving at a certain speed range in the forward (or, if desired, reverse) direction.

In some embodiments, the transmission control device comprises a moving, and preferably pivoting, guide member or members, and a mixing lever. The mixing lever is coupled to the continuously variable transmission devices through a suitable transmission linkage assembly, a preferred example of which is described hereinbelow. Preferably, the mixing lever is coupled to a hand-operated speed change lever similar to a stick shift lever. The speed change lever is employed to pivot or rotate the mixing lever about a first axis (e.g., a lateral or transverse axis) to select a speed or speed range and a direction (forward or reverse) at which the vehicle is to be driven. The speed change lever is also employed to select a neutral state. In a preferred embodiment in which the continuously variable transmission devices are based on a hydrostatic system, the neutral state corresponds to a stop state of the vehicle. The mixing lever also pivots or rotates about a second axis (e.g., a longitudinal axis) that is substantially perpendicular to the first axis. Movement of the steering handle actuates the guide member of the transmission control device to contact and move the mixing lever such that the mixing lever pivots about this second axis. Accordingly, both the steering handle and the speed change lever determine the position of the mixing lever, and in turn the state of the continuously variable transmission devices and, consequently, the respective angular velocities of the drive wheels.

In some embodiments, the transmission control device comprises a guide plate and a pair of spring-loaded guide members that cooperatively move the mixing lever in response to movement of the steering handle. For this purpose, the mixing lever extends through a distinctively shaped aperture of the guide plate and between the spring-loaded guide members. The position of the mixing lever within the aperture determines whether the vehicle moves in the forward or reverse direction, whether the vehicle is in a neutral state, the range of speed at which the vehicle moves, and whether the vehicle can be steered at a zero turn radius. The spring-loaded guide members are positioned so as to contact the mixing lever during initial movement of the steering handle, prior to contact by an edge of the guide plate aperture. Further movement of the steering handle in a desired steering direction eventually causes the edge of the guide plate aperture to also contact and move the mixing lever. By this configuration, the degree of response of the continuously variable transmission devices to the movement of the steering handle is gradually increased as the degree of movement of the steering handle is increased, thereby allowing greater control over the steering of the vehicle. The configuration also prevents the vehicle from being steered at a zero turn radius in response to only a slight movement of the steering handle while the vehicle is traveling at a high speed.

According to one embodiment, a steering control apparatus for a vehicle comprises a movable steering handle, first and second CVT devices for independently driving first and second drive wheels, respectively, a transmission control device, and first and second spring-loaded guide members. The transmission control device interconnects the steering handle and the first and second CVT devices, and comprises a mixing lever for controlling operations of the first and second CVT devices. The first and second guide members are disposed on opposite sides of the mixing lever. Movement of the steering handle in a first steering direction causes the first guide member to move the mixing lever in a first actuating direction, and movement of the steering handle in a second steering direction causes the second guide member to move the mixing lever in a second actuating direction.

In one aspect of this embodiment, the transmission control device comprises a pivotable guide plate communicating with the steering handle. The guide plate comprises an endless guide groove defining an aperture through the guide plate. The guide groove includes first and second groove edges, and the mixing lever extends through the aperture. Movement of the steering handle beyond a set value in the first steering direction causes the first groove edge to move the mixing lever in the first actuating direction, and movement of the steering handle beyond a set value in the second steering direction causes the second groove edge to move the mixing lever in the second actuating direction. Preferably, the first and second guide members are positioned relative to the guide plate for contacting the mixing lever prior to the first and second groove edges in response to movement of the steering handle. Preferably, the first and second guide members are mounted to the guide plate.

In another aspect of this embodiment, the apparatus comprises a change lever communicating with the mixing lever for pivoting the mixing lever into selected transmission drive positions. Preferably, the change lever is connected to the mixing lever for movement thereof in a longitudinal direction, and the first and second guide members are oriented relative to the mixing lever for movement thereof in a lateral direction substantially transverse to the longitudinal direction.

According to another embodiment, a steering control apparatus for a vehicle comprises a movable steering handle, first and second CVT devices for independently driving first and second drive wheels, respectively, a guide plate communicating with the steering handle and pivotable thereby, and a mixing lever. The guide plate comprises an endless guide groove including first and second groove edges and defining an aperture. The aperture comprises a narrow end area, a wide end area, a wide medial area adjacent to the wide end area, and a tapering area between the narrow area and the medial wide area. The mixing lever extends through the aperture and is selectively positionable in each area of the guide plate aperture. The mixing lever is connected to the first and second CVT devices for controlling respective operations thereof, wherein movement of the steering handle in a first steering direction causes the first groove edge to move the mixing lever in a first actuating direction and movement of the steering handle in a second steering direction causes the second groove edge to move the mixing lever in a second actuating direction.

According to one aspect of these embodiments, the mixing lever communicates with the first and second CVT devices such that the first and second CVT devices are neutral when the mixing lever is positioned in the medial wide area, the first and second CVT devices actively drive the first and second drive wheels in a first forward speed range when the mixing lever is positioned in the tapering area, the first and second CVT devices actively drive the first and second drive wheels in a second forward speed range when the mixing lever is positioned in the narrow end area, and the first and second CVT devices actively drive the first and second drive wheels in a reverse speed range when the mixing lever is positioned in the wide end area.

According to another aspect of these embodiments, the mixing lever communicates with the first and second CVT devices such that, when the mixing lever is positioned in the tapering area of the guide plate aperture, one of the CVT devices drives one of the drive wheels in a forward direction and the other CVT device simultaneously drives the other drive wheel in a reverse direction in response to movement of the steering handle beyond a set value in either the first or second steering direction.

According to yet another embodiment, a vehicle with transmission-controlled steering comprises a movable steering handle, first and second drive wheels, first and second CVT devices for independently driving the first and second drive wheels, respectively, a transmission control device, and first and second spring-loaded guide members. The transmission control device interconnects the steering handle and the first and second CVT devices, and comprises a mixing lever for controlling operations of the first and second CVT devices. The first and second spring-loaded guide members are disposed on opposite sides of the mixing lever. Movement of the steering handle in a first steering direction causes the first guide member to move the mixing lever in a first actuating direction, and movement of the steering handle in a second steering direction causes the second guide member to move the mixing lever in a second actuating direction. Preferably, the vehicle comprises one or more caster wheels that are turnable independently of the steering handle so as to facilitate steering the vehicle at a zero turn radius.

According to still another embodiment, a vehicle with transmission-controlled steering comprises a movable steering handle, first and second drive wheels, first and second CVT devices for independently driving the first and second drive wheels, respectively, a guide plate communicating with the steering handle and pivotable thereby, and a mixing lever. The guide plate comprises an endless guide groove defining an aperture. The aperture comprises a narrow end area, a wide end area, a wide medial area adjacent to the wide end area, and a tapering area between the narrow area and the medial wide area. The guide groove includes first and second groove edges. The mixing lever extends through the aperture and is selectively positionable in each area of the guide plate aperture. The mixing lever is connected to the first and second CVT devices for controlling respective operations thereof. Movement of the steering handle in a first steering direction causes the first groove edge to move the mixing lever in a first actuating direction, and movement of the steering handle in a second steering direction causes the second groove edge to move the mixing lever in a second actuating direction.

A method for steering a vehicle is also provided. Output power produced by a motor is coupled to first and second drive wheels through first and second CVT devices, respectively. A steering handle is moved in a selected steering direction to pivot a transmission control device comprising first and second spring-loaded guide members and a mixing lever extending between the first and second guide members. One of the guide members moves the mixing lever. Movement of the mixing lever causes the first CVT device to drive the first drive wheel at a first angular velocity, and the second CVT device to drive the second drive wheel at a second angular velocity that is different from the first angular velocity. The method can be implemented such that the first angular velocity has a forward direction component and the second angular velocity has a reverse direction component, thereby causing the vehicle to be steered according to a zero turn radius.

In one aspect of this method, the transmission control device comprises a guide plate pivotable therewith, and the guide plate comprises an endless guide groove defining an aperture through the guide plate. The guide groove comprises first and second opposing groove edges, and the mixing lever extends through the aperture between the groove edges. The steering handle is moved beyond a set value in the selected steering direction to cause one of the groove edges to move the mixing lever in cooperation with the one guide member. In another aspect, the guide groove defines a plurality of distinct operating areas of the aperture. The mixing lever is positioned at a selected one of the operating areas to select a running speed and an alternative forward or backward direction of movement for the vehicle during turning of the vehicle. Preferably, the aperture comprises a narrow-width area and a tapering-width area. The narrow-width area is disposed relative to the mixing lever so as to prevent the vehicle from being steered at zero turn radius when the mixing lever is positioned within the narrow-width area, and the tapering-width area is disposed relative to the mixing lever so as to permit the vehicle to be steered at zero turn radius when the mixing lever is positioned within the tapering-width area. Preferably, movement of the steering handle in the selected direction while the mixing lever is positioned in the tapering-width area causes one of the guide groove edges corresponding to the tapering-width area to move the mixing lever in both a transverse direction and a longitudinal direction, whereby the vehicle is both steered and slowed.

It is therefore an object of the present invention to provide an apparatus and method for steering a vehicle through control of its transmission and in such a manner that the vehicle can turn according to a zero turn radius.

An object of the invention having been stated hereinabove, and which is achieved in whole or in part by the invention disclosed herein, other objects will become evident as the description proceeds when taken in connection with the accompanying drawings as best described hereinbelow.

DETAILED DESCRIPTION OF THE INVENTION

Figure 1:
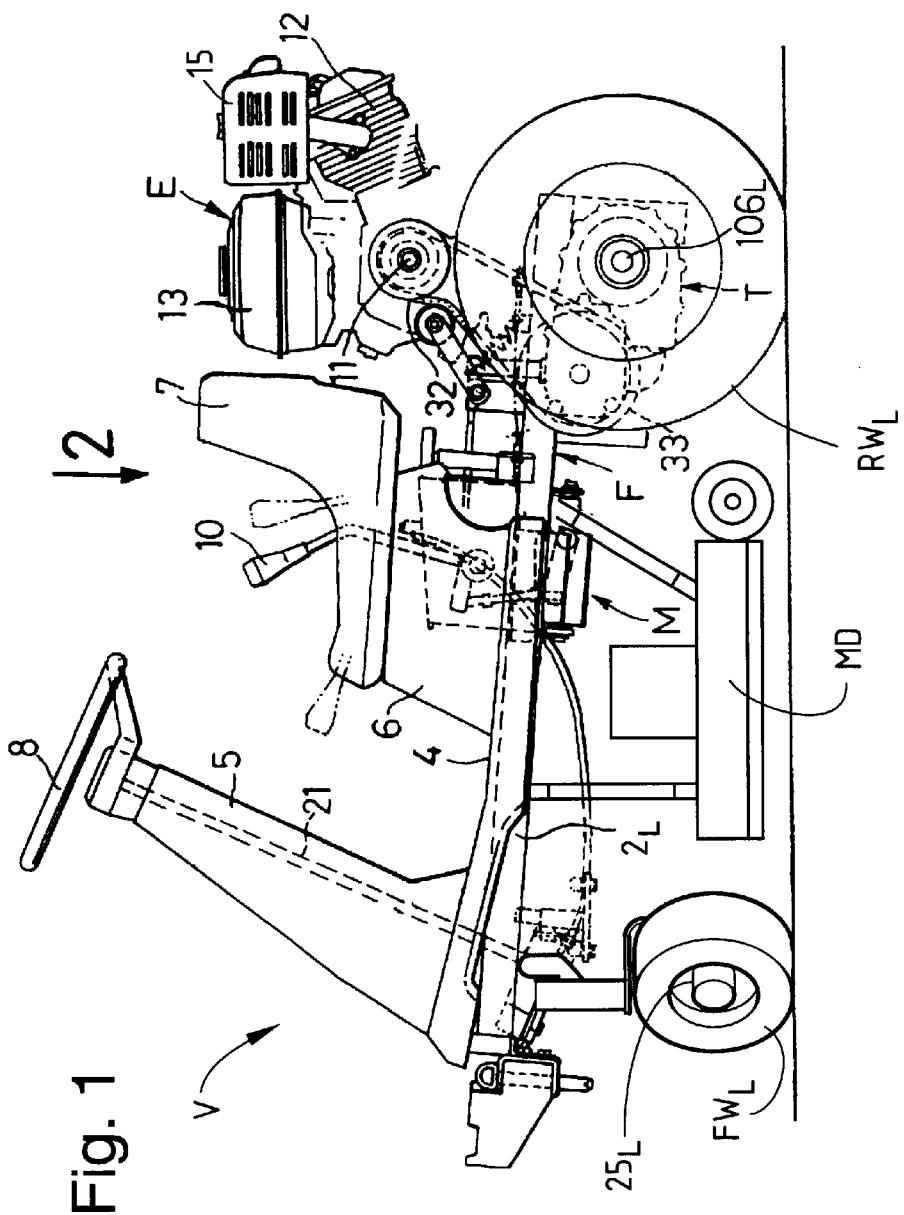
FIG. 1 is a side elevation view of a vehicle equipped with a continuously variable transmission and zero-turn-radius-capable steering control according to an embodiment disclosed herein.
Figure 2:
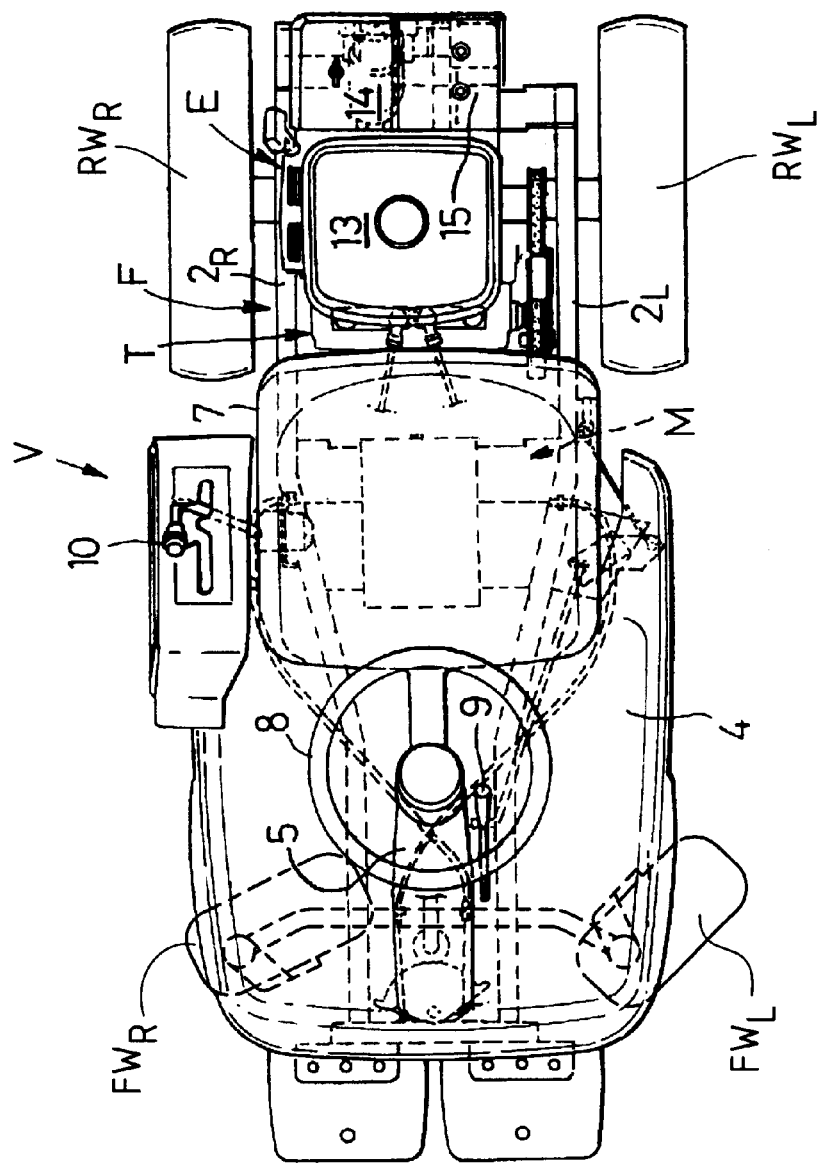
FIG. 2 is a top plan view of the vehicle of FIG. 1.

Referring first to FIGS. 1 and 2, a riding-type utility vehicle, generally designated V, is illustrated as an example of a steerable vehicle in which aspects of the present invention can be implemented. Vehicle V is illustrated as a riding lawnmower, although the invention encompasses any type of mobile, wheel-driven, steerable, engine-powered equipment. Vehicle V includes a pair of left and right front wheels $FW_L$, $FW_R$, which preferably are caster wheels, a pair of left and right rear driven wheels $RW_L$, $RW_R$, and a vehicle frame generally designated F. Vehicle frame F includes a pair of left and right side frames $2_L$, $2_R$ extending in a longitudinal direction of a vehicle body of utility vehicle V, and five cross frames $3_1$ to $3_5$ for connecting both the side frames $2_L$, $2_R$ (see FIGS. 5 and 6). Floor panel 4, handle post 5 and seat base 6 are mounted at a front portion of vehicle frame F. Seat 7 for a passenger is mounted on seat base 6. Steering wheel 8 is provided on an upper portion of handle post 5 for steering vehicle V by generating a difference in the number of rotations of left and right rear wheels $RW_L$, $RW_R$ through a continuously variable transmission (CVT) system, which preferably is a hydrostatic CVT system and is described hereinbelow. Steering wheel 8 and its associated linkages operate independently of front wheels $FW_L$, $FW_R$ which, as caster wheels in the preferred embodiment, freely swivel about vertical axes in response to movement of vehicle V. Steering wheel 8 may be of any type such as a rounded steering wheel, a steering bar, a rectangle shaped steering wheel or a steering lever. At the right side of seat 7, transmission speed change lever 10 is provided for moving vehicle V forward and backward and adjusting the speed of vehicle V.

Engine E, which typically is a single-cylinder, 4-cycle internal combustion engine, is provided on an upper surface of a rear portion of the vehicle body. Engine E includes a crankshaft 11 disposed in a lateral direction of the vehicle body and a cylinder 12 directed rearwardly and upwardly. Fuel tank 13, air cleaner 14 (FIG. 2) and muffler 15 are supported on an upper portion of engine E. Transmission system T is provided at a lower portion of engine E for converting a driving force of engine E into a hydraulic pressure to drive left and right rear wheels $RW_L$, $RW_R$. Transmission operating device M is mounted on a lower portion of seat 7. As described in detail hereinbelow, transmission operating device M in effect mixes the operations of both steering wheel 8 and change lever 10 and transmits the mixed operations to transmission T, so as to independently control the number of rotations of left and right rear wheels $RW_L$, $RW_R$. Mowing deck MD (FIG. 1) can be disposed below vehicle frame F between front wheels $FW_L$, $FW_R$ and rear wheels $RW_L$, $RW_R$ or can be disposed in any other suitable location. As can be appreciated by persons skilled in the art, mowing deck MD houses one or more sets of cutting blades (not shown) that are rotatably driven by engine E through a suitable coupling assembly (not shown).

Figure 3:
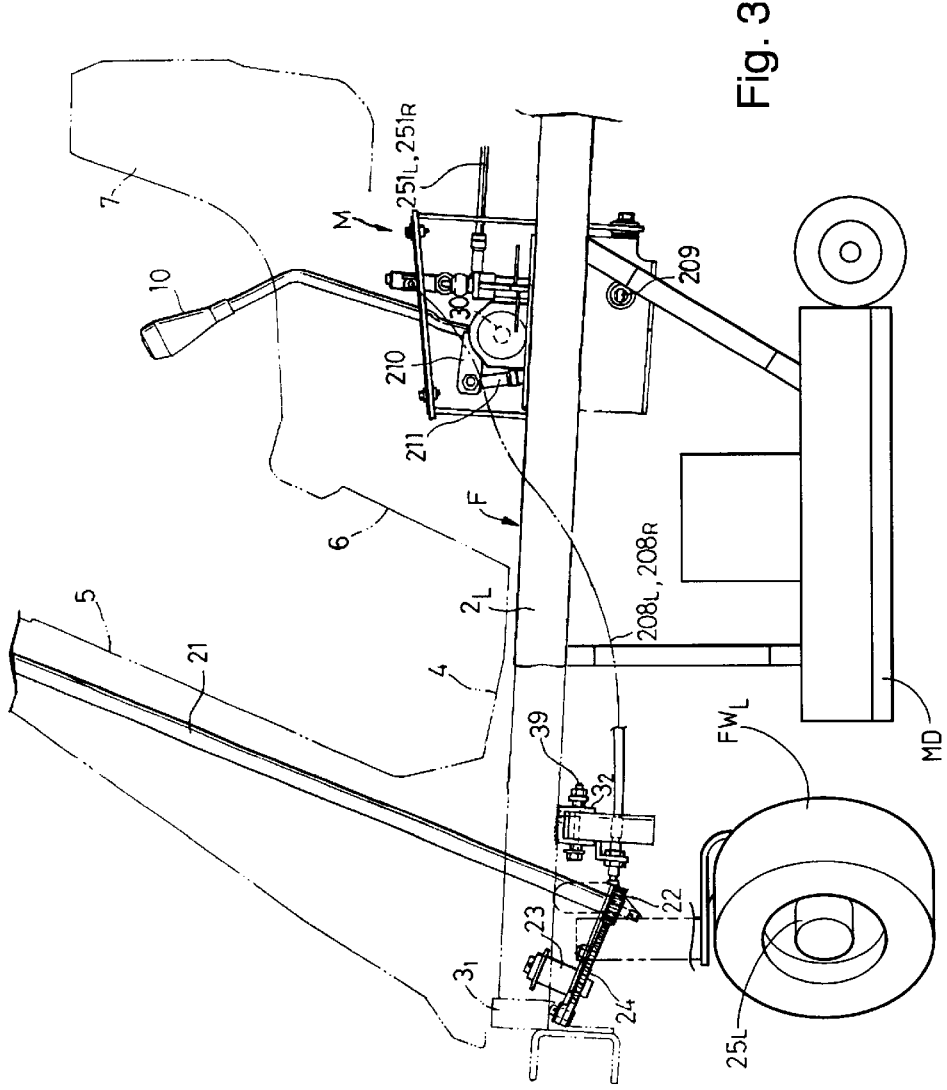
FIG. 3 is a side elevation view of a front portion of the vehicle.
Figure 5:
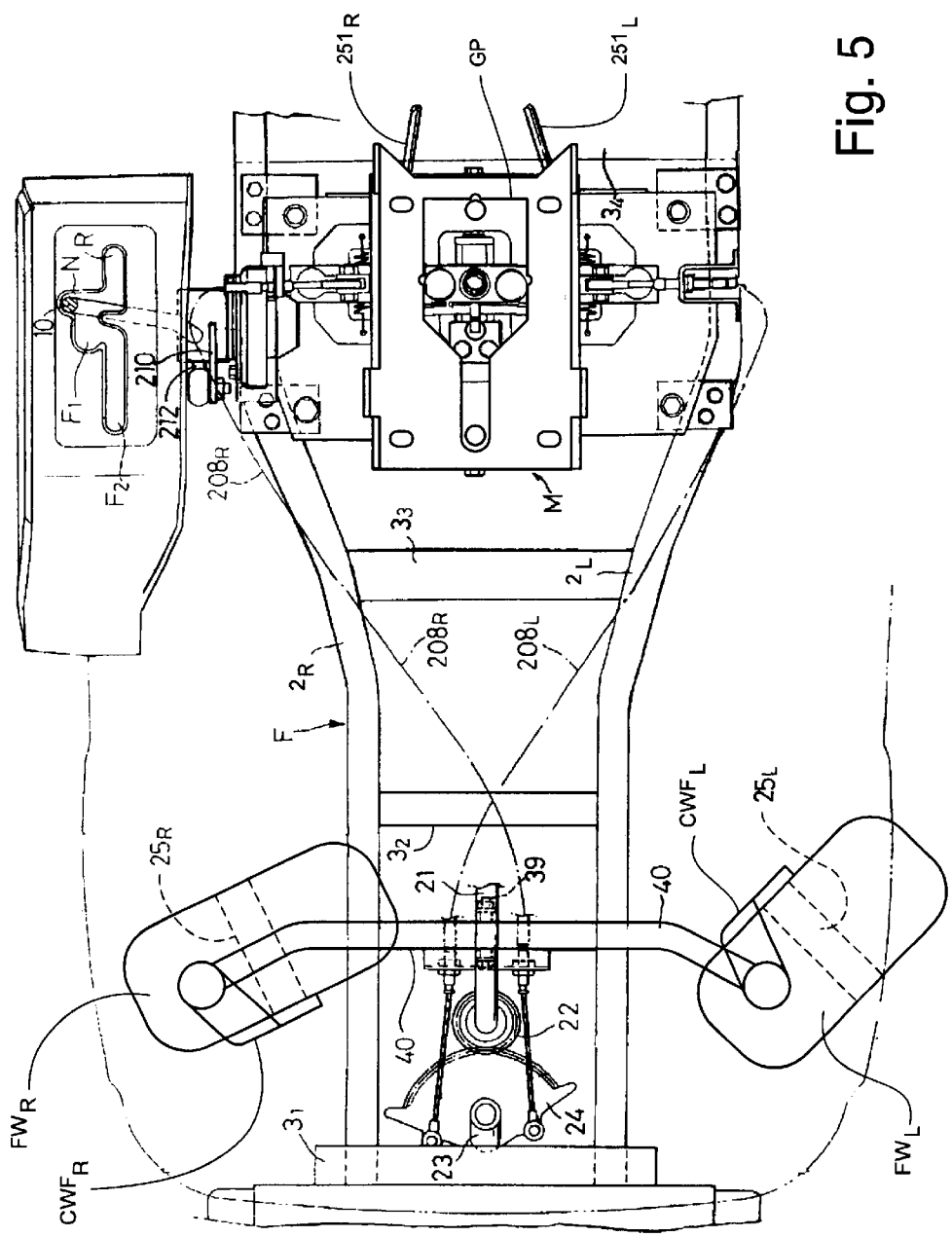
FIG. 5 is a top plan view of the front portion of the vehicle.

Referring now to FIG. 3 and FIG. 5, gear 22 is secured to the lower end of steering shaft 21 connected to steering wheel 8 (FIG. 1). Sector gear 24, pivotally supported by pivot 23, is engaged with gear 22. A pair of suitable elongate, flexible linkage members such as left and right cables $208_L$, $208_R$ are connected to sector gear 23. Cables $208_L$, $208_R$ are connected to transmission operating device M in a manner described hereinbelow. When steering wheel 8 is operated, steering shaft 21, gear 22, and sector gear 23 rotate in response, and either left or right cable $208_L$ or $208_R$ is pulled forwardly. For example, when steering wheel 8 is turned to the left (counterclockwise), steering shaft 21 and gear 22 rotate counterclockwise, sector gear 23 rotates clockwise and left cable $208_L$ is pulled forwardly. As also shown in FIG. 5, left and right front wheels $FW_L$, $FW_R$ are respectively supported by left and right caster wheel frames $CWF_L$ and $CWF_R$ and rotate about individual left and right front axles $25_L$, $25_R$. Left and right caster wheel frames $CWF_L$, $CWF_R$ are respectively attached to vehicle frame F through lateral support member 40. Lateral support member 40 can include one or more structural components as necessary for attaching caster wheel frames $CWF_L$, $CWF_R$ to vehicle frame F.

Figure 4:
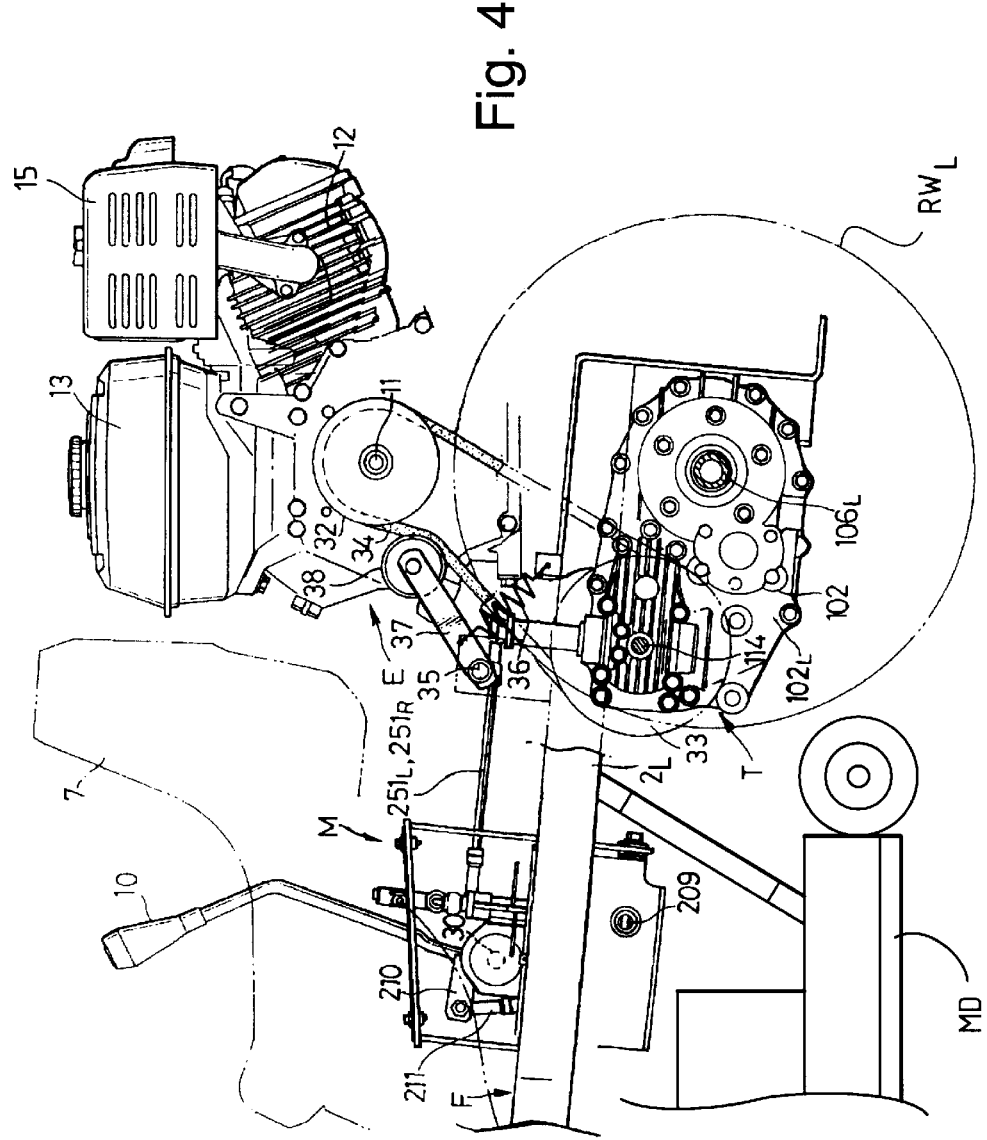
FIG. 4 is a side elevation view of a rear portion of the vehicle.
Figure 6:
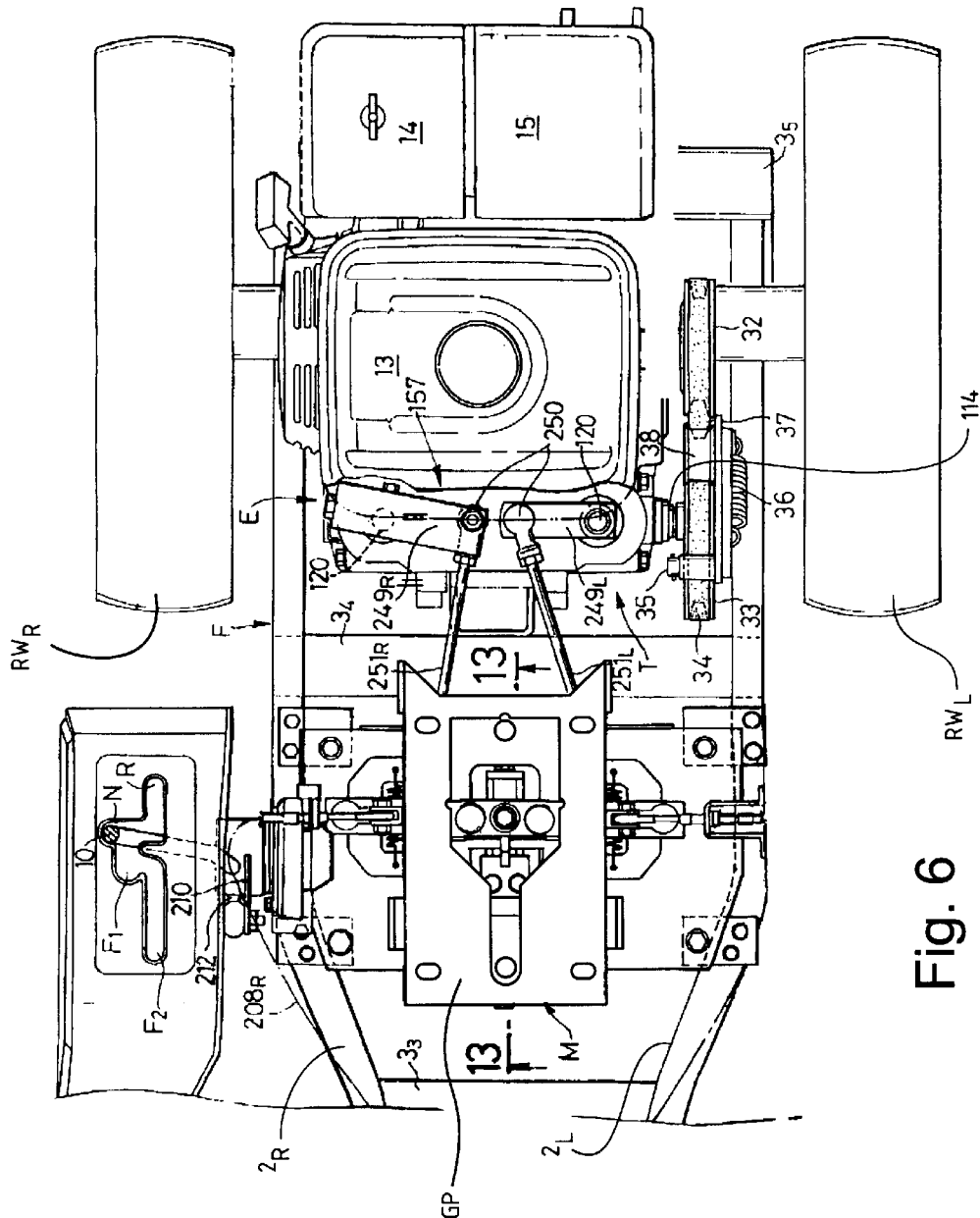
FIG. 6 is a top plan view of the rear portion of the vehicle.

Referring now to FIG. 4 and FIG. 6, change lever 10 is pivoted for swinging movement longitudinally and laterally through pivot 30 which extends in the lateral direction of the vehicle body. When change lever 10 is at a neutral or stop position N, vehicle V is stopped. When change lever 10 is swung forward from the neutral position, vehicle V begins to run or travel forward at, for example, 0 km/h to +5.2 km/h. When the forward swing angle of change lever 10 is, for example, 14°, change lever 10 is at a working or mowing speed position $F_1$, (FIG. 6), and the vehicle speed is +2.5 km/h. When the forward swing angle is 42°, change lever 10 is at a running or transport speed position $F_2$, and the vehicle speed is +5.2 km/h. When change lever 10 is swung rearward from the neutral position, vehicle V begins to run or travel backward at 0 km/h to −2.4 km/h. At the rearward swing angle of 20°, change lever 10 is at reverse speed position R, and the vehicle speed is −2.4 km/h.

It will be appreciated that the magnitudes of the vehicle speed and the corresponding swing angles of change lever 10 at its various positions are given by way of example only, and can be changed arbitrarily. For instance, vehicle speed is dependent on, among other things, engine speed, transmission design, and drive wheel size. If, for example, a diameter of each of the driven rear wheels $RW_L$, $RW_R$ is enlarged to 1.15 times, the abovementioned various speeds will be increased by a proportionate ratio.

TRANSMISSION SYSTEM

Referring now to FIGS. 7 to 12, the structure of transmission system T for transmitting a driving force of engine E to left and right rear wheels $RW_L$, $RW_R$ is described hereinbelow.

Figure 7:
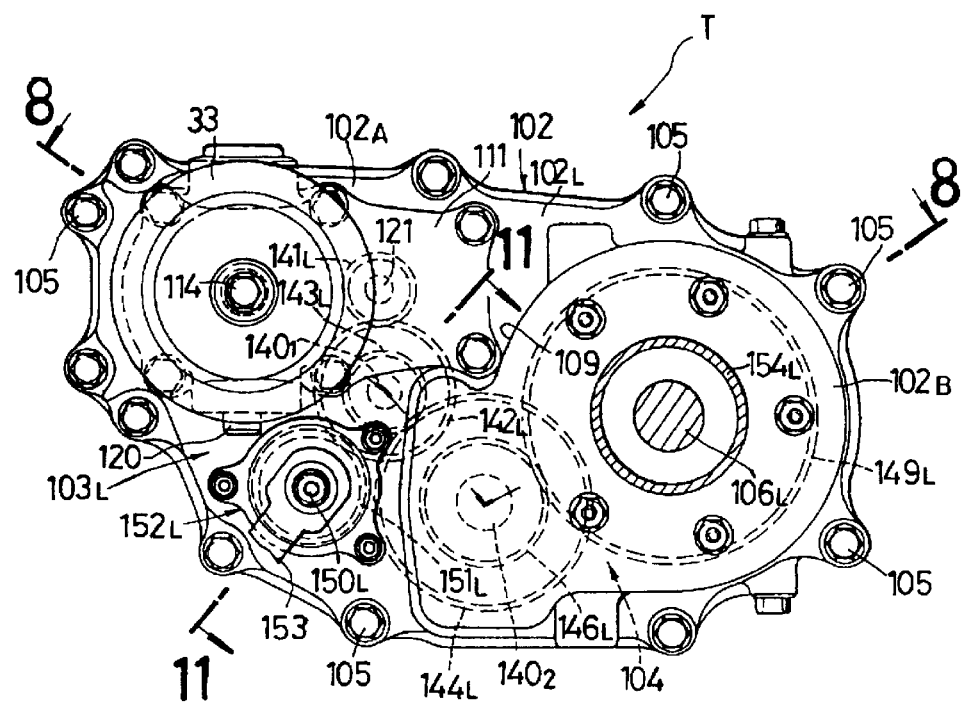
FIG. 7 is a side elevation view of a transmission system provided with the vehicle.
Figure 8:
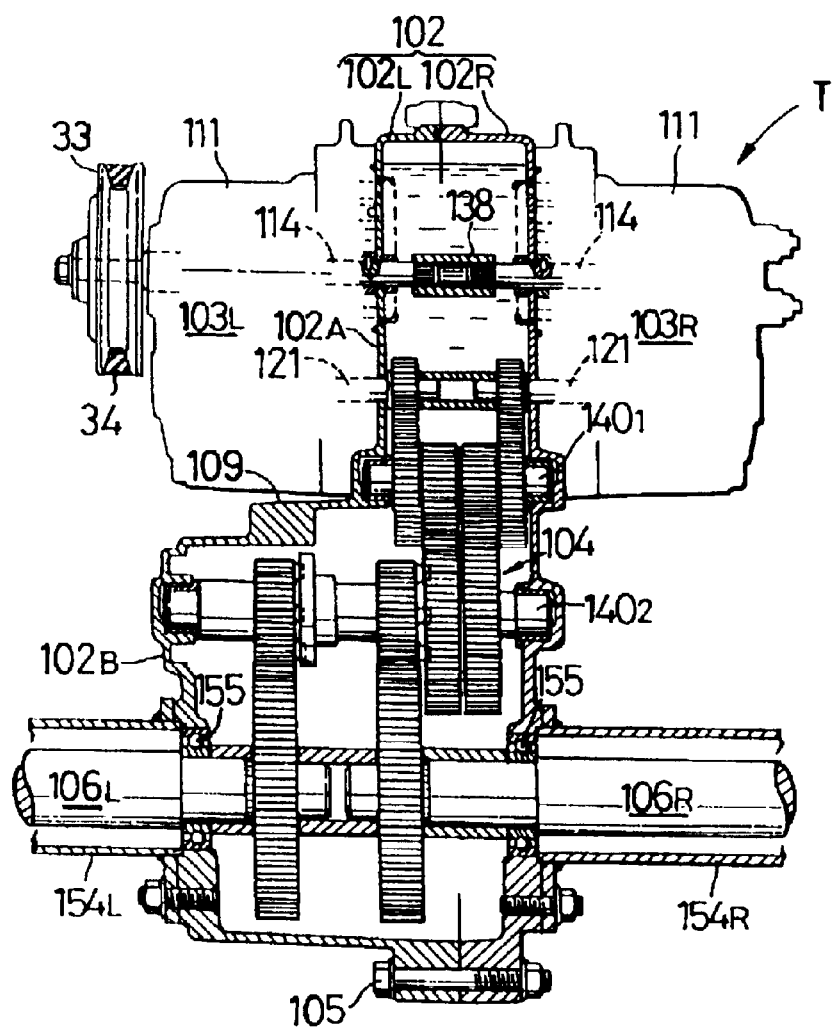
FIG. 8 is a partially cutaway view of the transmission system, taken along cutaway lines 8—8 shown in FIG. 7.

In FIGS. 7 and 8, transmission system T includes transmission case generally designated 102, a pair of hydrostatic continuously variable transmissions (CVTs) generally designated $103_L$, $103_R$ provided on the left and right sides of transmission case 102 respectively, speed reduction device generally designated 104 disposed in transmission case 102, and a pair of axles $106_L$, $106_R$ penetrating through left and right side walls of transmission case 102, respectively. Left and right rear wheels $RW_L$, $RW_R$ are provided at outer ends of axles $106_L$, $106_R$, respectively.

Transmission case 102 is formed by joining open ends of left case half $102_L$ and right case half $102_R$, split on a plane orthogonal to an axial line of axles $106_L$, $106_R$, separably through bolts 105. The outer side of left case half $102_L$ is more projected at its lower half than at its upper half, so as to form step 109 therebetween. Right case half $102_R$ is formed generally flat on the outer side surface. In this way, transmission case 102 has a narrow portion $102_A$ above step 109 and wide portion $102_B$ below step 109. A pair of hydrostatic continuously variable transmissions $103_L$, $103_R$ are respectively provided on the left and right sides of narrow portion $102_A$. Left and right axles $106_L$, $106_R$ are respectively supported within cylindrical axle cases $154_L$, $154_R$ by bearings 155, 155 mounted on left and right side walls of wide portion $102_B$ of transmission case 102.

Figure 9:
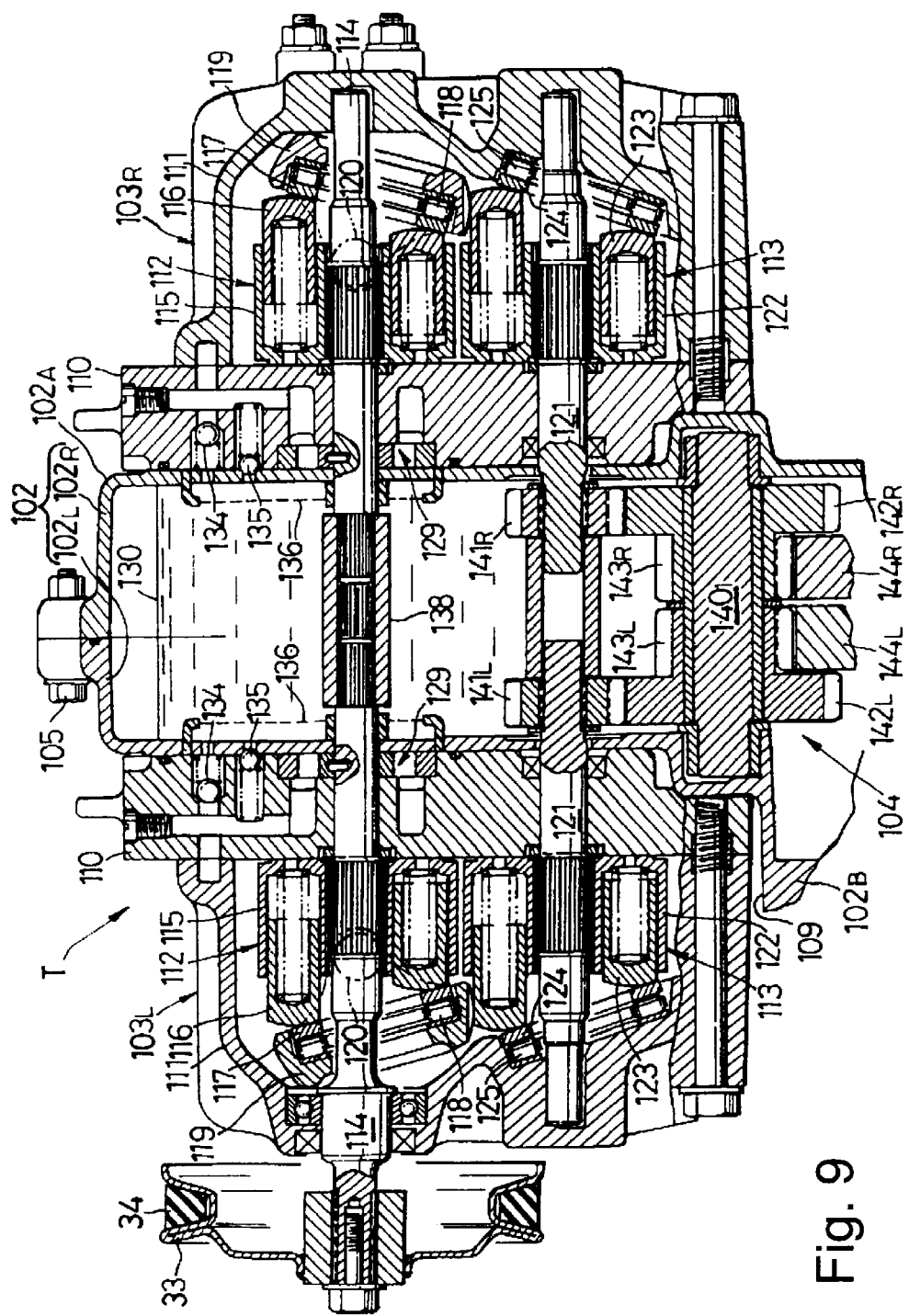
FIG. 9 is a cutaway view of an upper section of the transmission system illustrating a transverse cross-section thereof.

As shown in FIGS. 7 and 9, left and right hydrostatic continuously variable transmissions $103_L$, $103_R$ are identical in structure, and disposed symmetrically. Each of continuously variable transmissions $103_L$, $103_R$ includes distribution plate 110 bolted separately to the outer side of case halves $102_L$, $102_R$. Housing 111 is bolted to distribution plate 110. Each continuously variable transmission $103_L$, $103_R$ also includes hydraulic pump generally designated 112 and hydraulic motor generally designated 113 are disposed in housing 111. Each hydraulic pump 112 includes pump shaft 114, pump cylinders 115, pump plungers 116, pump swash plate 117, and swash plate holder 119. Pump shaft 114 penetrates through distribution plate 110. Pump cylinders 115 are spline coupled to pump shaft 114 and are slidably and rotatably connected closely with distribution plate 110. Pump plungers 116 are slidably fitted to pump cylinders 115 in an annular arrangement surrounding pump shaft 114. Pump swash plate 117 abuts against outer ends of pump plungers 116. Swash plate holder 119 bears against the back side of pump swash plate 117 with thrust bearing 118. Swash plate holder 119 is supported on housing 111 through a pair of swash plate shafts 120 that have an axial line which is orthogonal to the axial line of pump shaft 114. Pump swash plate 117 is tiltable between one maximum inclination position (transport speed position) and another maximum inclination position (reverse speed position) through an erect position (neutral position) orthogonal to pump shaft 114.

As shown in FIG. 6, left and right transmission speed change arms $249_L$, $249_R$ are respectively secured at the outer ends of left and right swash plate shafts $120_L$, $120_R$ of swash plate holders 119. By turning left and right transmission speed change arms $249_L$, $249_R$, the angle of each swash plate 117 can be adjusted.

Each hydraulic motor 113 includes motor shaft 121, motor cylinders 122, motor plungers 123, and motor swash plate 124. Motor shaft 121 penetrates through distributing plate 110. Motor cylinders 122 are spline coupled with motor shaft 121 and slidably and rotatably connected closely with distribution plate 110. Motor plungers 123 are angularly arranged to surround motor shaft 121 and are slidably fitted to motor cylinders 122. Motorswash plate 124 abuts against outer ends of motor plungers 123. The back side of motor swash plate 124 is supported in housing 111 through thrust bearing 125 in a state inclined by a specific angle to motor shaft 121.

Left and right pump shafts 114, 114 are coupled collinearly through joint 138 in narrow portion $102_A$ of transmission case 102. On the other hand, left and right motor shafts 121, 121 are disposed so as to be rotatable relatively and collinearly.

Figure 12:
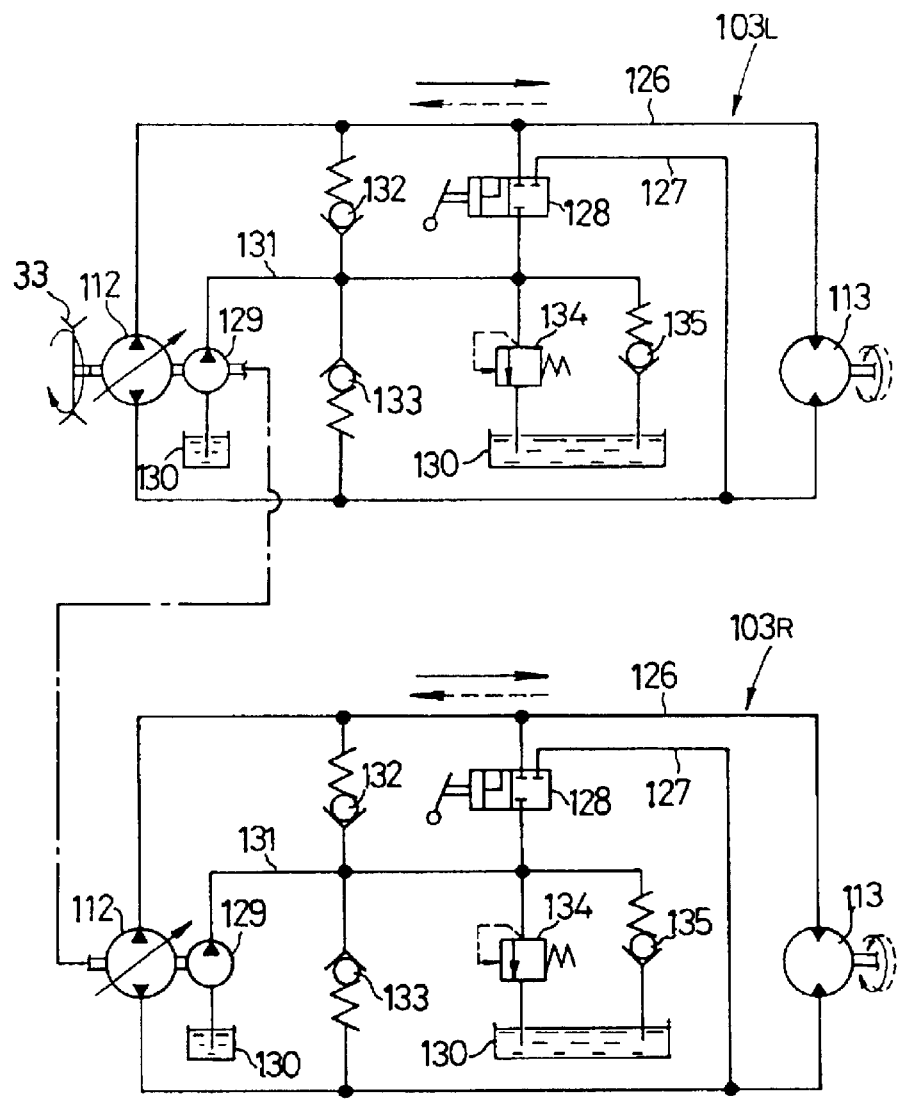
FIG. 12 is a schematic view of a hydraulic circuit of the transmission system.

Referring now to FIG. 12, hydraulically closed circuit 126 of transmission system T is illustrated. In the hydrostatic continuously variable transmissions $103_L$, $103_R$, hydraulic pump 112 and hydraulic motor 113 are mutually connected through hydraulically closed circuit 126. In hydraulically closed circuit 126, bypass passage 127 is provided for connecting between a high pressure side and a low pressure side of circuit 126. Release valve 128, opened and closed by manual operation, is interposed in passage 127. Hydraulic pump 112 is connected to working oil supply pump 129 driven by pump shaft 114. The working oil supply pump 129 operates to pump up the working oil from oil sump 130 to send it under pressure to oil feed passage 131. Oil feed passage 131 is connected to the high pressure side and low pressure side of hydraulically closed circuit 126 through one-way valves 132, 133, respectively. If necessary, oil feed passage 131 may be connected to oil sump 130 through relief valve 134 and suction valve 135 which are in mutual parallel relation.

When release valve 128 is closed, if hydraulic pump 112 is driven in a state where pump swash plate 117 is inclined to the forward side, the working oil flows in hydraulically closed circuit 126 in the direction of a solid line arrow. At that time, motor shaft 121 of hydraulic motor 113 rotates normally at the current ratio of the capacity of hydraulic pump 112 and the capacity of hydraulic motor 113 at this time as the speed change ratio. On the other hand, if pump swash plate 117 is inclined to the reverse side, the working oil flows in hydraulically closed circuit 126 in the direction of a broken line arrow, so that motor shaft 121 rotates reversely. At that time, if an oil leak occurs in hydraulically closed circuit 126, one of the one-way valves 132 and 133 which corresponds to the low pressure side at this time opens, and the working oil is supplied from working oil supply pump 129 into hydraulically closed circuit 126. If a pressure in oil feed passage 131 is increased by a certain value, relief valve 134 is opened so as to prevent the pressure in oil feed passage 131 from excessively increasing. When the high pressure side and low pressure side are suddenly inverted in hydraulically closed circuit 126 due to an engine brake, if a supply of working oil to the low pressure side from working oil supply pump 129 is insufficient, suction valve 135 is opened, and the oil in oil sump 130 is sucked into the low pressure side, thereby preventing air suction by hydraulically closed circuit 126.

In FIG. 9, oil sump 130 is defined between both case halves $102_L$, $102_R$ of transmission case 102. Inside each distribution plate 110, there is disposed oil filter 136 immersed in oil sump 130 through each suction portion of working oil supply pump 129 and suction valve 135. The working oil to be supplied into working oil supply pump 129 and suction valve 135 is thus filtered.

Figure 10:
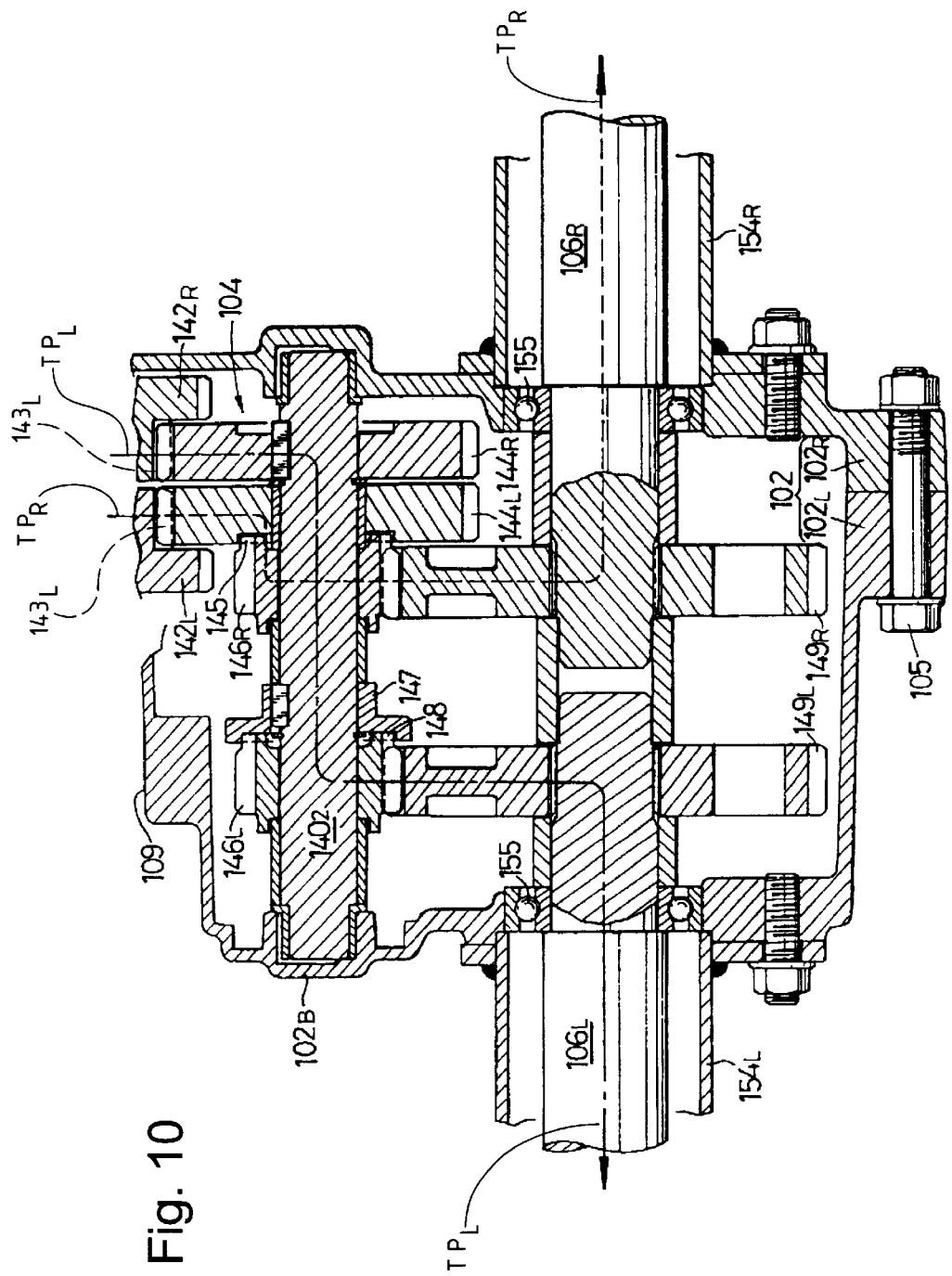
FIG. 10 is a cutaway view of a lower section of the transmission system illustrating a transverse cross-section thereof.

Referring to FIGS. 9 and 10, speed reduction device 104 includes first and second intermediate shafts $140_1$, and $140_2$. First and second intermediate shafts $140_1$, $140_2$ are rotatably supported, in parallel to axles $106_L$, $106_R$, on narrow portion $102_A$ and wide portion $102_B$ of transmission case 102, respectively. Speed reduction device 104 also includes a number of gears, as follows: left and right first small gears $141_L$, $141_R$; left and right first large gears $142_L$, $142_R$; left and right second small gears $143_L$, $143_R$; left and right second large gears $144_L$, $144_R$; left and right final small gears $146_L$, $146_R$; and left and right final large gears $149_L$, $149_R$.

As shown in FIG. 9, left and right first small gears $141_L$, $141_R$ are secured to inner ends of right and left motor shafts 121, 121, respectively. Left and right first large gears $142_L$, $142_R$ are engaged with first small gears $141_L$, $141_R$ and are rotatably supported on first intermediate shaft $140_1$. Left and right second small gears $143_L$, $143_R$ are formed integrally with opposed ends of first large gears $142_L$, $142_R$, respectively. Right second large gear $144_R$ is engaged with right second small gear $143_R$.

As shown in FIG. 10, right second large gear $144_R$ is coupled by key or spline to the right end of second intermediate shaft $140_2$ and thus rotates with second intermediate shaft $140_2$. Left second large gear $144_L$ is engaged with left second small gear $143_L$ and is rotatably supported on second intermediate shaft $140_2$ adjacent to the left side of right second large gear $144_R$. Right final small gear $146_R$ is rotatably supported on second intermediate shaft $140_2$ and is coupled to the left end of left second large gear $144_L$ through a dog clutch 145. A clutch body 147 is coupled by key or spline with second intermediate shaft $140_2$ at the left side of right final small gear $146_R$. Left final small gear $146_L$ is rotatably supported on second intermediate shaft $140_2$ and is coupled to the left end of clutch body 147 through a dog clutch 148. Left and right final large gears $149_L$, $149_R$ are spline coupled with left and right axles $106_L$, $106_R$ and are engaged with left and right final gears $146_L$, $146_R$, respectively.

Through the above-described gear arrangements, the driving force of right side hydraulic motor 113 is transmitted to left side axle $106_L$ according to left wheel transmission path $TP_L$ indicated in FIG. 10, and the driving force of left side hydraulic motor 113 is transmitted to right side axle $106_R$ through right wheel transmission path $TP_R$ also indicated in FIG. 10. Referring to FIGS. 9 and 10, left wheel transmission path $TP_L$ can be defined as follows: right side hydraulic motor 113→right side motor shaft 121→right first small gear $141_R$→right first large gear $142_R$→right second small gear $143_R$→right second large gear $144_R$→second intermediate shaft $140_2$→clutch body 147 and dog clutch 148→left final small gear $146_L$→left final large gear $149_L$→left axle $106_L$→left rear wheel $RW_L$ (FIG. 6). Right wheel transmission path $TP_R$ can be defined as follows: left side hydraulic motor 113→left side motor shaft 121→left first small gear $141_L$→left first large gear $142_L$→left second small gear $143_L$→left second large gear $144_L$→dog clutch 145→right final small gear $146_R$→right final large gear $149_R$→right axle $106_R$→right rear wheel $RW_R$ (FIG. 6).

Alternatively, it can be appreciated that the gear arrangements and thus left and right transmission paths $TP_L$, $TP_R$ could be modified such that the driving force of left side hydraulic motor 113 is transmitted to left axle $106_L$ and the driving force of right side hydraulic motor 113 is transmitted to right axle $106_R$.

Figure 11:
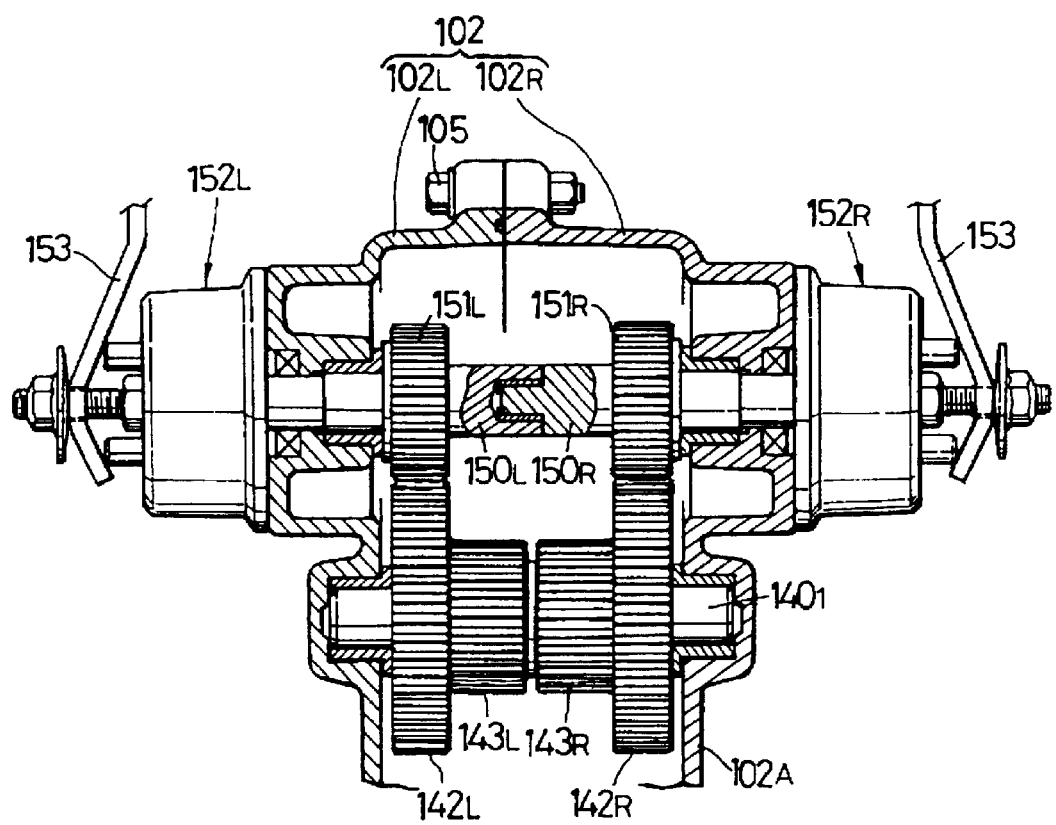
FIG. 11 is a partially cutaway view of the transmission system, taken along cutaway lines 11—11 shown in FIG. 7.

As shown in FIGS. 7 and 11, in narrow portion $102_A$ of transmission case 102, a pair of left and right brake shafts $150_L$, $150_R$, parallel to the first intermediate shaft $140_1$ and coaxial with each other, are relatively rotatably supported. Brake shafts $150_L$, $150_R$ are secured with a pair of brake gears $151_L$, $151_R$ to be engaged with first large gears $142_L$, $142_R$ respectively. Left and right brake shafts $150_L$, $150_R$ are projected to the left and right sides of narrow portion $102_A$, and are respectively provided with brake devices $152_L$, $152_R$ operated by a tension of brake lever 153. Alternatively, instead of engaging brake gears $151_L$, $151_R$ with first large gears $142_L$, $142_R$, brake gears $151_L$, $151_R$ may be engaged with second large gears $144_L$, $144_R$.

As shown in FIG. 4 and, one of pump shafts 114 projects outward from the front part of left case half $102_L$. Endless belt 34 is wound between transmission drive pulley 32, provided on crankshaft 11 of engine E, and transmission driven pulley 33 provided on pump shaft 114. Tension pulley 38 is provided at a tip end of tension pulley support arm 37 that is pivoted on pivot 35 and biased by spring 36. Tension pulley 38 abuts against endless belt 34 to generate a predetermined tension.

In this way, the driving force of engine E is distributed to pump shafts 114, 114 of left and right hydrostatic continuously variable transmissions $103_L$, $103_R$ through transmission drive pulley 32, endless belt 34, and transmission driven pulley 33. These distributed driving forces are properly changed in speeds, and then outputted to speed reduction device 104 through corresponding motor shafts 121, 121. The driving force output to speed reduction device 104 from motor shaft 121 of right side hydrostatic continuously variable transmission $103_R$ is transmitted to left side axle $106_L$, whereas the driving force output to speed reduction device 104 from motor shaft 121 of left side hydrostatic continuously variable transmission $103_L$ is transmitted to right side axle $106_R$, so that left and right rear wheels $RW_L$, $RW_R$ are driven to move vehicle V.

In this case, in left and right hydrostatic continuously variable transmissions $103_L$, $103_R$, if both pump swash plates 117, 117 are tilted to the forward side, both motor shafts 121, 121 rotate normally, and vehicle V runs forward. If both pump swash plates 117, 117 are tilted to the reverse side, both motor shafts 121, 121 rotate reversely, and vehicle V can travel backward. Moreover, by varying the speed change ratio of left and right hydrostatic continuously variable transmissions $103_L$, $103_R$ such that the tilting angles of left and right pump swash plates 117, 117 become different from each other, a difference is caused in the rotating speeds of left and right motor shafts 121, 121, so that vehicle V can turn. As described hereinbelow in accordance with the invention, depending on the position of change lever 10, vehicle V can be turned at a zero turn radius (ZTR) by causing one motor shaft 121 to rotate in the forward direction and the other motor shaft 121 to rotate in the reverse direction.

The rotating speed of engine E is variable, but in one embodiment can be fixed at 3600 RPM in an ordinary operating state.

TRANSMISSION OPERATING DEVICE

Next, referring to FIGS. 13 to 16, the structure of transmission operating device M will be described. Transmission operating device M mixes the operations of steering wheel 8 and change lever 10 so as to move vehicle V forward and backward and turn it left and right.

Figure 13:
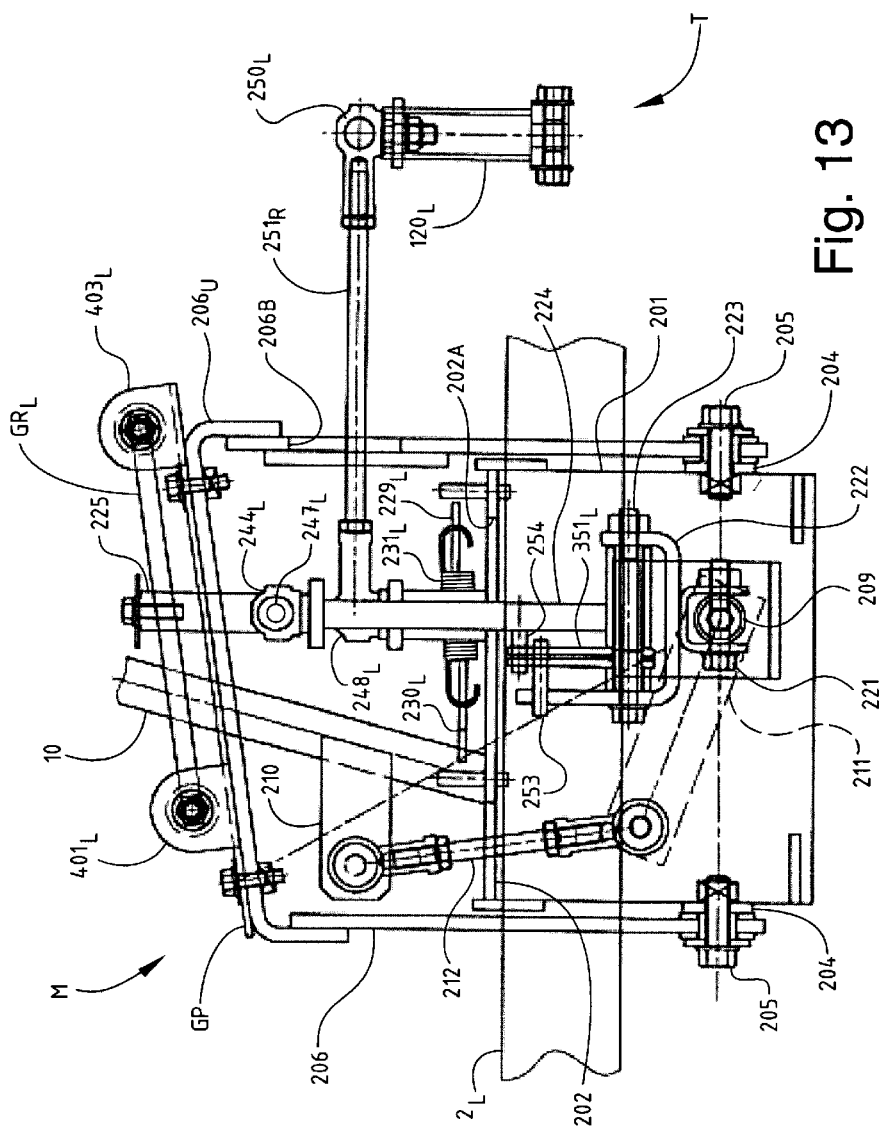
FIG. 13 is a cutaway side elevation view of a transmission control device provided with the vehicle.
Figure 14:
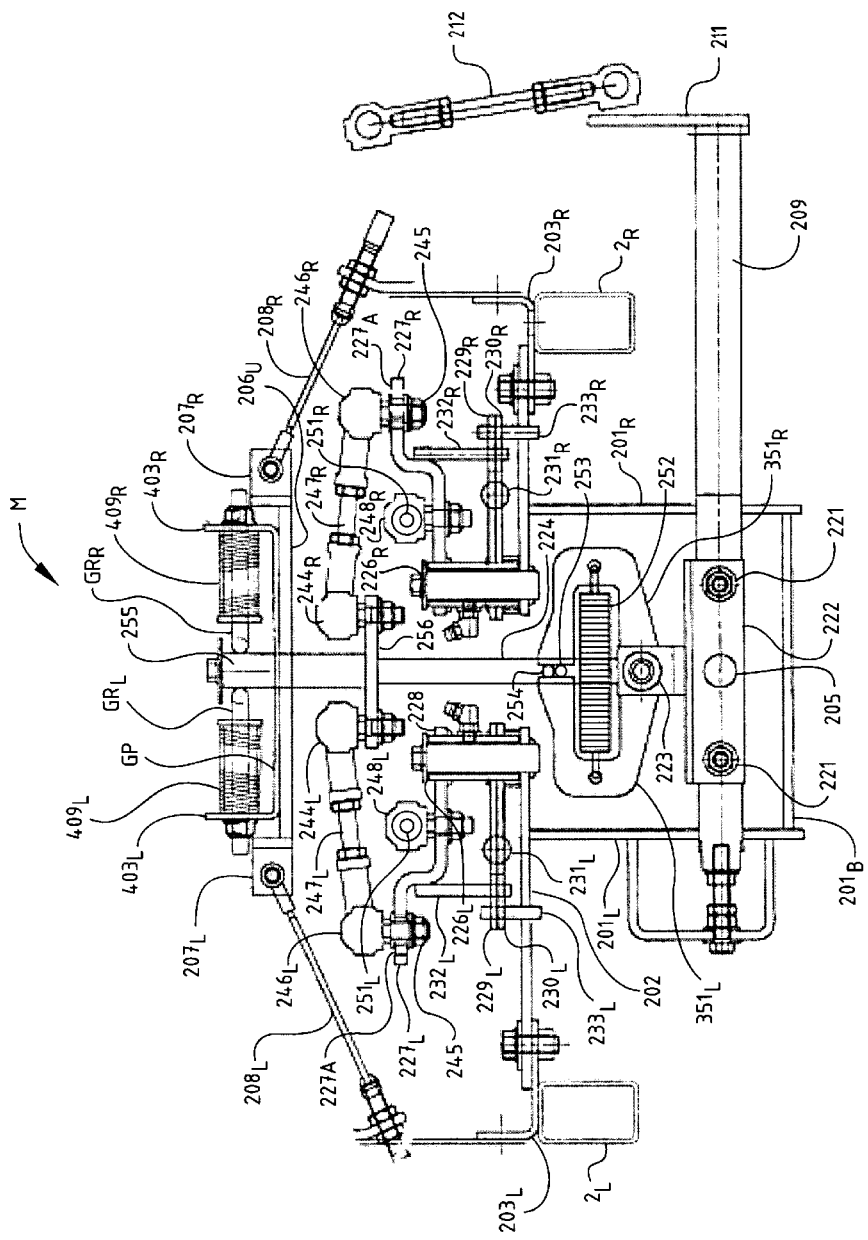
FIG. 14 is a cutaway rear elevation view of the transmission control device.

As shown in FIG. 13, transmission operating device M includes base member 201. As shown in FIG. 14, base member 201 has left and right opposite walls $201_L$, $201_R$ as well as bottom wall $201_B$, and its upper end is opened. Base member 201 thus has a substantially C-shaped cross-section. Supporting plate 202 is connected to an upper end of base member 201, and is supported on side frames $2_L$, $2_R$ of vehicle V through two left stays $203_L$ and two right stays $203_R$ (see FIG. 14). Guide member 206, having a generally reversed U-shape when viewed from the side in FIG. 13, is pivotally supported for laterally swinging movements at its front and rear lower ends on a pair of brackets 204, 204 welded to front and rear portions of base member 201 through longitudinally extended pivots 205, 205 (see also FIG. 16).

As shown in FIG. 14, cables $208_L$, $208_R$ are connected at their one end to a pair of wire joints $207_L$, $207_R$, respectively, provided at upper end $206_u$ of guide member 206. As described hereinabove, the other ends of cables $208_L$, $208_R$ are connected to sector gear 24 (see FIG. 5), which is turned by steering wheel 8. Therefore, if steering wheel 8 is operated to turn vehicle V, guide member 206 is laterally swung around pivots 205, 205 through cables $208_L$, $208_R$. It will be noted in FIG. 5 that left cable $208_L$ is connected to the right side of sector gear 24, and right cable $208_R$ is connected to the left side of sector gear 24. Thus, for example, if steering wheel 8 is turned to the left (counterclockwise), right cable $208_R$ is actuated to swing guide member 206 clockwise to the right.

Referring to FIGS. 13–16, laterally extended rotary shaft 209 is rotatably supported at a lower portion of base member 201. As best shown in FIG. 13, upper arm 210 is secured to pivot shaft 30 of change lever 10, and lower arm 211 is secured to right end of rotary shaft 209. Upper arm 210 and lower arm 211 are connected with each other through adjustable rod 212. Rotary shaft 209 is turned by swinging change lever 10 longitudinally.

Figure 16:
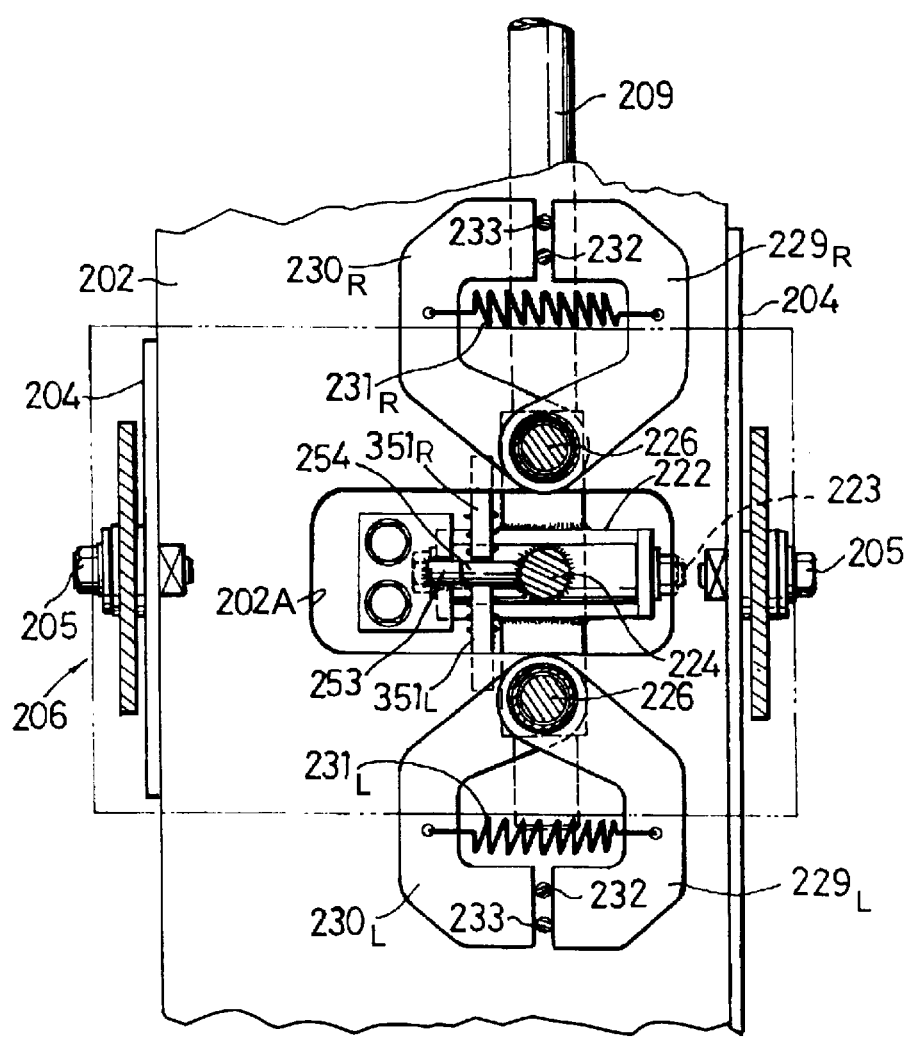
FIG. 16 is another cutaway top plan view of the transmission control device, with certain components thereof removed.
Figure 17:
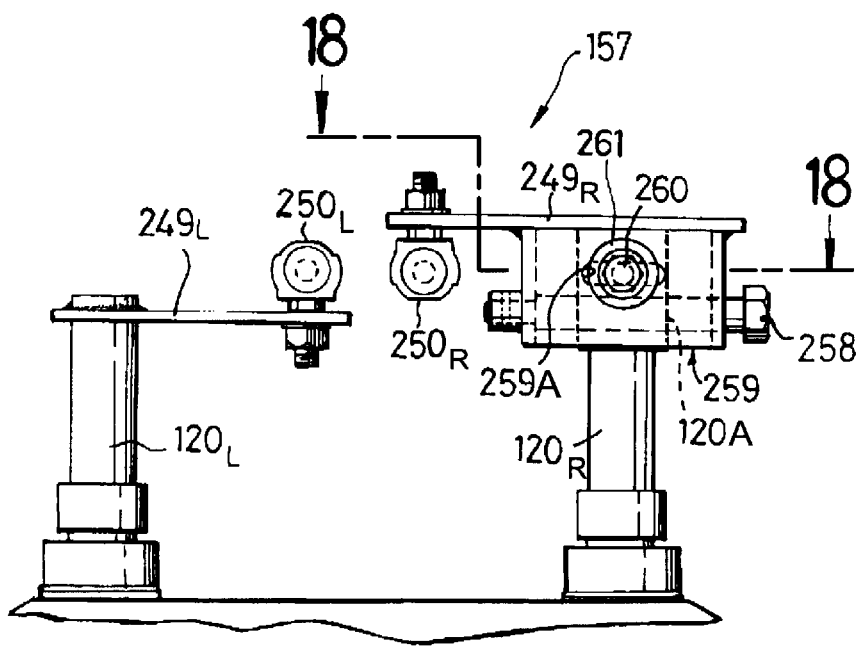
FIG. 17 is a rear elevation view of transmission speed change arms and associated linkages providing an interface between the transmission control device and the transmission system.
Figure 18:
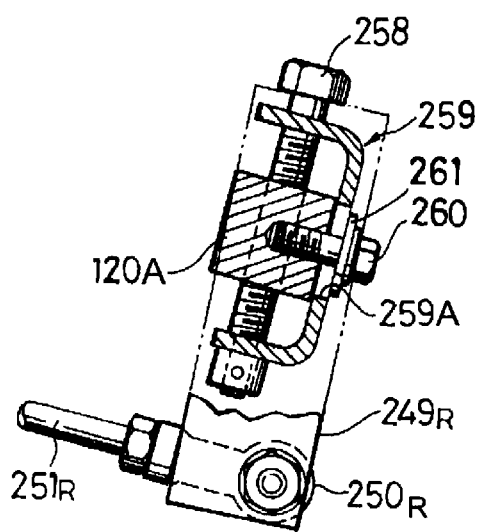
FIG. 18 is a partially cutaway view of one of the transmission speed change arms, taken along cutaway lines 18—18 shown in FIG. 17.

Bracket 222 is secured to rotary shaft 209 by two bolts 221, 221 (FIG. 14). Mixing lever 224 is pivotally supported at its lower end by bracket 222 through pivot pin 223, such that mixing lever 224 can swing laterally. As best shown in FIG. 16, mixing lever 224 passes through opening 202A of supporting plate 202 to extend upward. A pair of left and right neutral plates $351_L$, $351_R$ (FIG. 14) are pivotally supported by pivot pin 223 such that neutral plates $351_L$, $351_R$ can swing independently from each other. Neutral plates $351_L$, $351_R$ are biased toward each other by neutral spring 252. Left and right neutral plates $351_L$, $351_R$ are stopped at positions where neutral plates $351_L$, $351_R$ abut against stationary neutral pin 253 provided at an upper end of bracket 222.

Movable neutral pin 254, provided on mixing lever 224, is clamped between neutral plates $351_L$, $351_R$, thereby stably stopping mixing lever 224 in the neutral position. If mixing lever 224 is turned leftward, left neutral plate $351_L$, which is pushed by movable neutral pin 254, is swung leftward while extending neutral spring 252. If mixing lever 224 is turned rightward, right neutral plate $351_R$, which is also pushed by movable neutral pin 254, is swung rightward while extending neutral spring 252.

Figure 19:
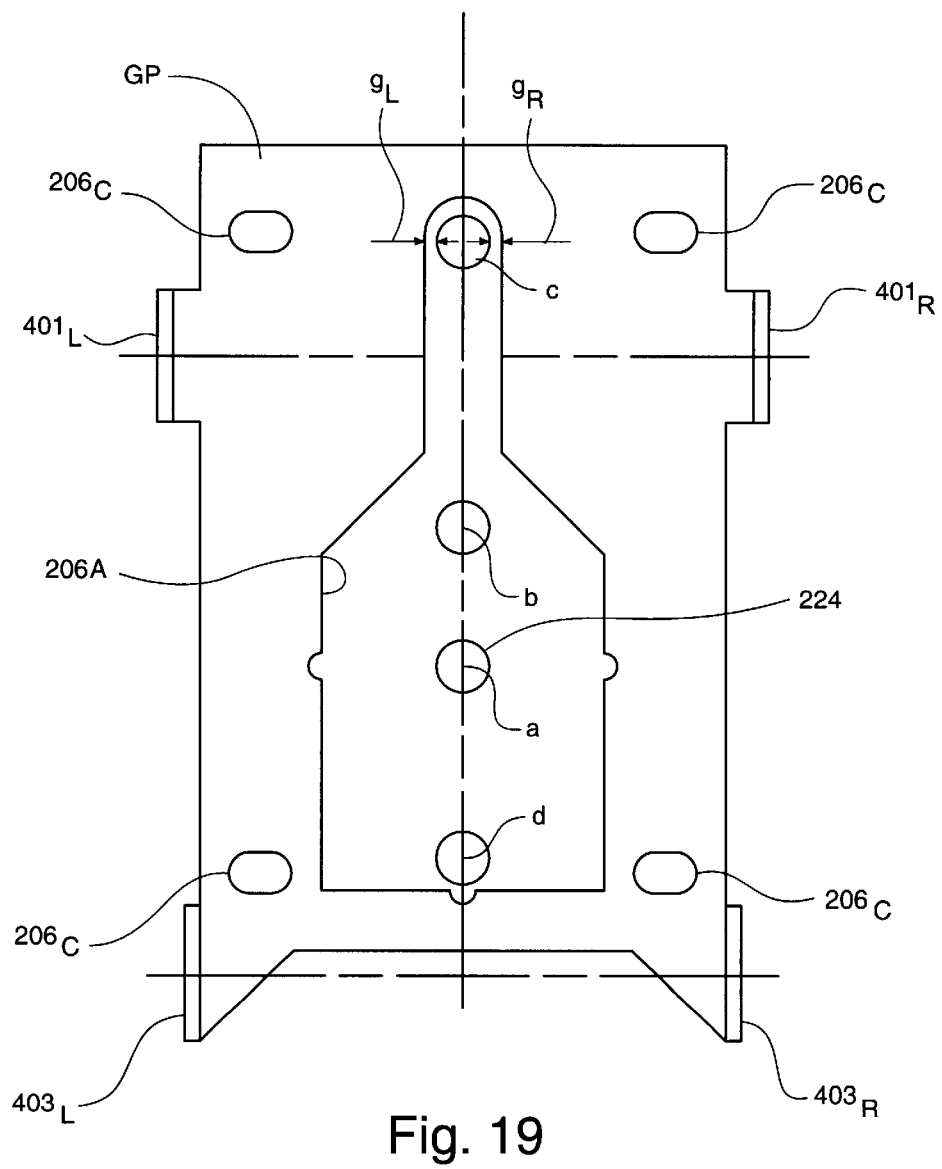
FIG. 19 is a top plan view of a guide plate provided with the transmission control device, illustrating different positions of a mixing lever provided with the transmission control device.

Guide plate GP is secured on upper end $206_u$ of guide member 206 by a bolt and a nut. As best shown in FIG. 19, guide plate GP is formed with guide groove 206A which is elongated in a longitudinal direction. Guide groove 206A is endless and thus forms an aperture through the thickness of guide plate GP. The aperture has areas of differing or varying widths as described hereinbelow. Mixing lever 224 is loosely received in guide groove 206A. A position of guide plate 206 can be adjusted in a lateral direction along elongated holes 206C formed in guide member 206, and a lateral turning characteristic of the vehicle can be uniformalized by such an adjustment of the position.

Figure 15:
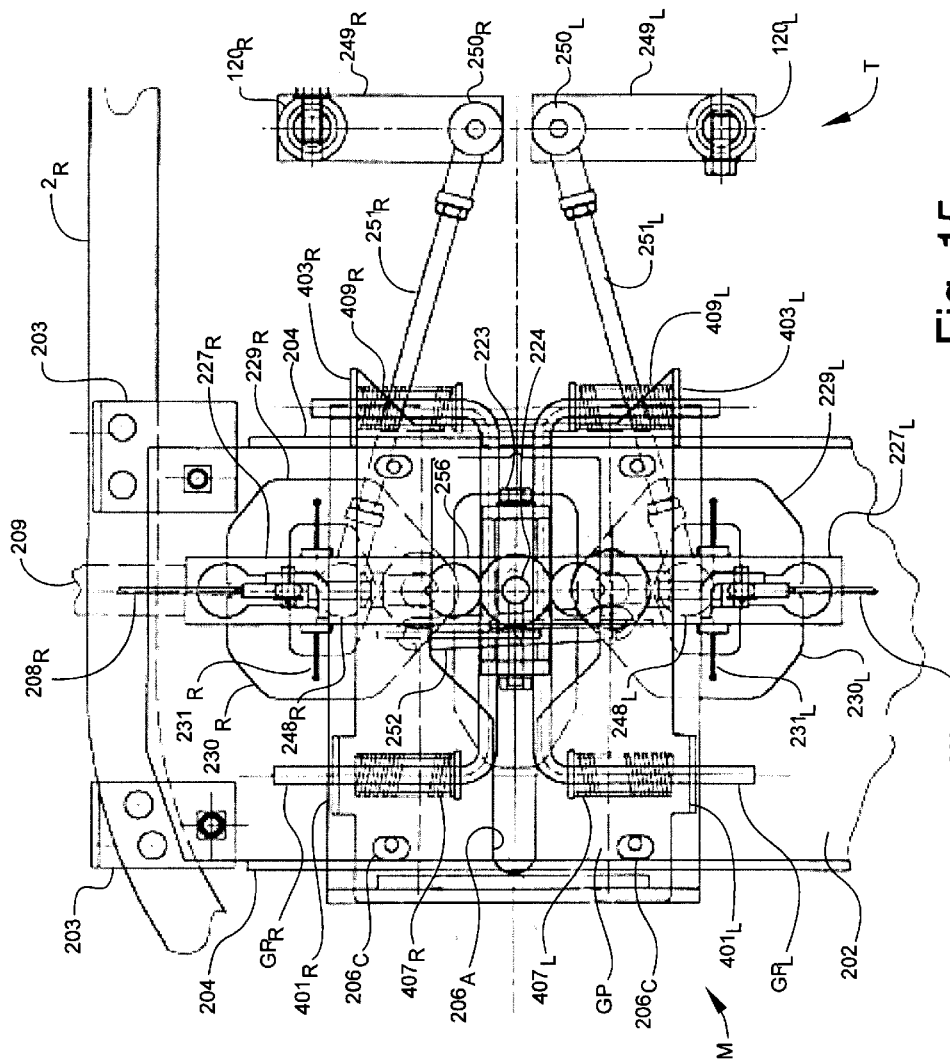
FIG. 15 is a cutaway top plan view of the transmission control device.

Referring back to FIGS. 13, 14 and 15, a pair of left and right front mounting brackets $401_L$, $401_R$, respectively, and a pair of left and right rear mounting brackets $403_L$, $403_R$, respectively, are formed on guide plate GP and extend upward. Left guide rail $405_L$ is supported in left front mounting bracket 401 L and left rear mounting bracket $403_L$. Right guide rail $405_R$ is supported in right front mounting bracket $401_R$ and right rear mounting bracket $403_R$. As shown in FIG. 15, the main portions of left and right guide rails $405_L$, $405_R$ extend parallel to each other in the longitudinal direction, above the open area defined by the tapered and wide portions of guide groove 206A of guide plate GP. Guide roller 255, which is rotatably supported around an upper outer periphery of mixing lever 224, extends between the main, parallel portions of legs and right guide rails $405_L$, $405_R$. Left guide rail $405_L$ is laterally spring-loaded by left front guide rail spring $407_L$ and left rear guide rail spring $409_L$. Right guide rail $405_R$ is laterally spring-loaded by right front guide rail spring $407_R$ and right rear guide rail spring $409_R$. As an alternative to guide rail springs $407_L$, $407_R$, $409_L$, and $409_R$, other suitable means for biasing left and right guide rails $405_L$, $405_R$ could be employed. Left and right guide rails $405_L$, $405_R$ control and guide mixing lever 224 in a manner described hereinbelow.

If change lever 10 is operated to turn rotary shaft 209 longitudinally, mixing lever 224 is swung longitudinally along guide groove 206A. As a result of the arrangement of guide plate GP and guide rails $GR_L$, $GR_R$, if steering wheel 8 is operated to laterally swing guide member 206 around pivots 205, 205, either left or right guide rail $GR_L$ or $GR_R$ initially abuts against guide roller 255, thereby pushing guide roller 255, so that mixing lever 224 is laterally swung around pivot pin 223. When the steering angle exceeds a predetermined value, guide member 206 is swung far enough to one side or the other to cause either the left or right edge of guide groove 206A to also abut against and push guide roller 255, and mixing lever 224 starts swinging farther and with greater force.

As best shown in FIG. 19, guide groove 206A is formed into a bottle-like shaped aperture in guide plate GP. The width of guide groove 206A in a lateral direction is set such that a portion of guide groove 206A corresponding to position of a mixing lever 224, the neutral position (vehicle speed V=0 km/hr), defines a medial wide area. The width of a portion of guide groove $206_A$ corresponding to position b of mixing lever 224, the mowing speed position (vehicle speed, e.g., V=+2.5 km/hr), defines a tapering area. The width of guide groove 206A corresponding to position c of mixing lever 224, the transport speed position (vehicle speed, e.g., V=+5.2 km/hr), is the narrowest and defines a narrow end area. The width of this narrow end area is only slightly greater than the diameter of the portion of mixing lever 224 engagable by guide groove 206A (i.e., guide roller 255 in the illustrated embodiment). Thus, as shown in FIG. 19, in the transverse or lateral (left/right) direction, a close-tolerance gap $g_L$, $g_R$ is defined on each side of mixing lever 224 between the left or right edge of guide groove 206A and mixing lever 224. The smallness of each gap $g_L$, $g_R$ ensures that the left or right edge of guide groove 206A will actuate mixing lever 224 in response to only a slight turning of steering wheel 8, when mixing lever 224 has been positioned in the narrow end are of guide groove 206A. In one exemplary embodiment, the size of each gap $g_L$, $g_R$ ranges from approximately 0 to approximately 2 mm. Finally, the width of guide groove 206A corresponding to position d of mixing lever 224, the reverse position (vehicle speed V=–2.5 km/hr), is the same as or similar to the width corresponding to position a and defines a wide end area.

Referring to FIGS. 14 and 16, the base ends of a pair of left and right control arms $227_L$, $227_R$ are supported for longitudinal swinging movement by a pair of left and right pivot shafts $226_L$, $226_R$ which are embedded on an upper surface of supporting plate 202. A pair of upper and lower left neutral plates $229_L$, $230_L$ are pivotally supported by left pivot shaft $226_L$, and are biased by left neutral spring $231_L$ toward each other. Left neutral pin $232_L$, downwardly secured to left control arm $227_L$, and left neutral pin $233_L$, upwardly secured to supporting plate 202, are clamped between both left neutral plates $229_L$ and $230_L$. Likewise, a pair of upper and lower right neutral plates $229_R$, $230_R$ are pivotally supported by right pivot shaft $226_R$, and are biased by right neutral spring $231_R$ toward each other. Right neutral pin $232_R$, downwardly secured to right control arm $227_R$, and right neutral pin $233_R$, upwardly secured to supporting plate 202, are clamped between both right neutral plates $229_R$ and $230_R$. Therefore, control arms $227_L$, $227_R$ are biased toward a neutral position, i.e., a position in which control arms $227_L$, $227_R$ extend straight in a lateral direction as shown in FIG. 15.

As shown in FIG. 14, inner ball joints $244_L$, $244_R$ are respectively provided at left and right opposite ends of bracket 256 secured to mixing lever 224. Control arms $227_L$, $227_R$ are formed at their tip ends with elongated holes 227A, 227A extended in a longitudinal direction of control arms $227_L$, $227_R$. Outer ball joints $246_L$, $246_R$ are slidably supported in elongated holes 227A, 227A through bolts 245, 245. Inner ball joints $244_L$, $244_R$ and outer ball joints $246_L$, $246_R$ are respectively interconnected by a pair of push-pull rods $247_L$, $247_R$ whose lengths can be adjusted in a turnbuckle manner. When mixing lever 224 is in a vertical neutral position (position a in FIG. 19), push-pull rods $247_L$, $247_R$ are linearly superposed on control arms $227_L$, $227_R$, as viewed from above.

Referring to FIG. 15, left and right control arms $227_L$, $227_R$ are provided at their intermediate portions with a pair of front ball joints $248_L$, $248_R$, respectively. As indicated hereinabove, transmission system T includes a pair of swash plate shafts $120_L$, $120_R$ that are provided at their upper ends with transmission speed change arms $249_L$, $249_R$. Transmission speed change arms $249_L$, $249_R$ are provided at their tip ends with a pair of rear ball joints $250_L$, $250_R$, respectively. Front ball joints $248_L$, $248_R$ and rear ball joints 250, 250 are interconnected by a pair of push-pull rods $251_L$, $251_R$ whose lengths can be adjusted in a turnbuckle manner. In order to avoid interference with push-pull rods $251_L$, $251_R$, opening 206B (see FIG. 13) is formed in a rear surface of guide member 206. Therefore, if change lever 10 and steering wheel 8 are operated, transmission arms $249_L$, $249_R$ of transmission T are swung in association with swinging movements of control arms $227_L$, $227_R$ of transmission operating device M, and the number of rotations of left and right rear wheels $RW_L$, $RW_R$ are increased or decreased by means of the internal structural architecture and hydraulic circuitry of transmission system T.

PUMP VOLUME FINE ADJUSTING MECHANISM

Next, a preferred structure for pump volume-fine adjusting mechanism 157 will be described with reference to FIGS. 13, 15, 17 and 18.

Pump volume-fine adjusting mechanism 157 (shown in FIG. 17) is for adjusting the volume of hydraulic pumps 112, 112 of left and right hydrostatic continuously variable transmissions $103_L$, $103_R$ (see FIG. 9) when steering wheel 8 is kept in the neutral position to move vehicle V straight backward or forward, thereby eliminating an error in output rotational numbers of both hydrostatic continuously variable transmissions $103_L$, $103_R$ so as to compensate the unintentional turning tendency of vehicle V. Pump volume-fine adjusting mechanism 157 includes push-pull rods $251_L$, $251_R$ whose lengths can be adjusted in a turnbuckle manner. By adjusting the lengths of push-pull rods $251_L$, $251_R$, it is possible to adjust each of the output rotational numbers of left and right hydrostatic continuously variable transmissions $103_L$, $103_R$ to zero.

The length of right transmission arm $249_R$ can be adjusted such that the rate of changes of continuously variable transmissions $103_L$, $103_R$ homologize with each other. More specifically, adjust bolt 258 is threadedly engaged to pass through angled shaft portion 120A of right swash plate shaft $120_R$ of right continuously variable transmission $103_R$. U-shaped follower member 259 is slidably locked to adjust bolt 258. Follower member 259 is slidably contacted with a side of angled shaft portion 120A, and is formed at its intermediate portion with elongated hole 259A which is in parallel to adjust bolt 258. Locking bolt 260, passing through elongated hole 259A, is threadedly inserted into one side of angled shaft portion 120A through flush washer 261. Right transmission speed change arm $249_R$ is integrally secured to an upper surface of follower member 259.

If adjust bolt 258 is rotated in a state where locking bolt 258 is lightly loosen, follower member 259 is moved along elongated hole 259A along with adjust bolt 258, and the arm length of right transmission speed change arm $249_R$ is varied. When a predetermined or desired length is obtained, right transmission speed change arm $249_R$ is secured to right swash plate shaft $120_R$ by tightening locking bolt 260.

If the arm length of right transmission speed change arm $249_R$ is shortened, the rate of changes in the output rotational numbers of right continuously variable transmission $103_R$ is decreased. Therefore, by appropriately adjusting the arm length, it is possible to homologize the output rotational numbers of both left and right continuously variable transmissions $103_L$, $103_R$, and to move vehicle V straight irrespective of the running speed.

OPERATION

The operation of the embodiment of the invention described hereinabove will now be described. Hereinafter, the term "inner wheel" is defined as a vehicle wheel that is on an inner side of vehicle V during turning of vehicle V, and the term "outer wheel" is defined as a vehicle wheel that is on an outer side of vehicle V during turning of vehicle V. The operation of the invention, and the relationship between the behavior of vehicle V and the operations of steering wheel 8 and change lever 10, are described hereinbelow primarily with reference to FIGS. 19–25C.

Figure 20:
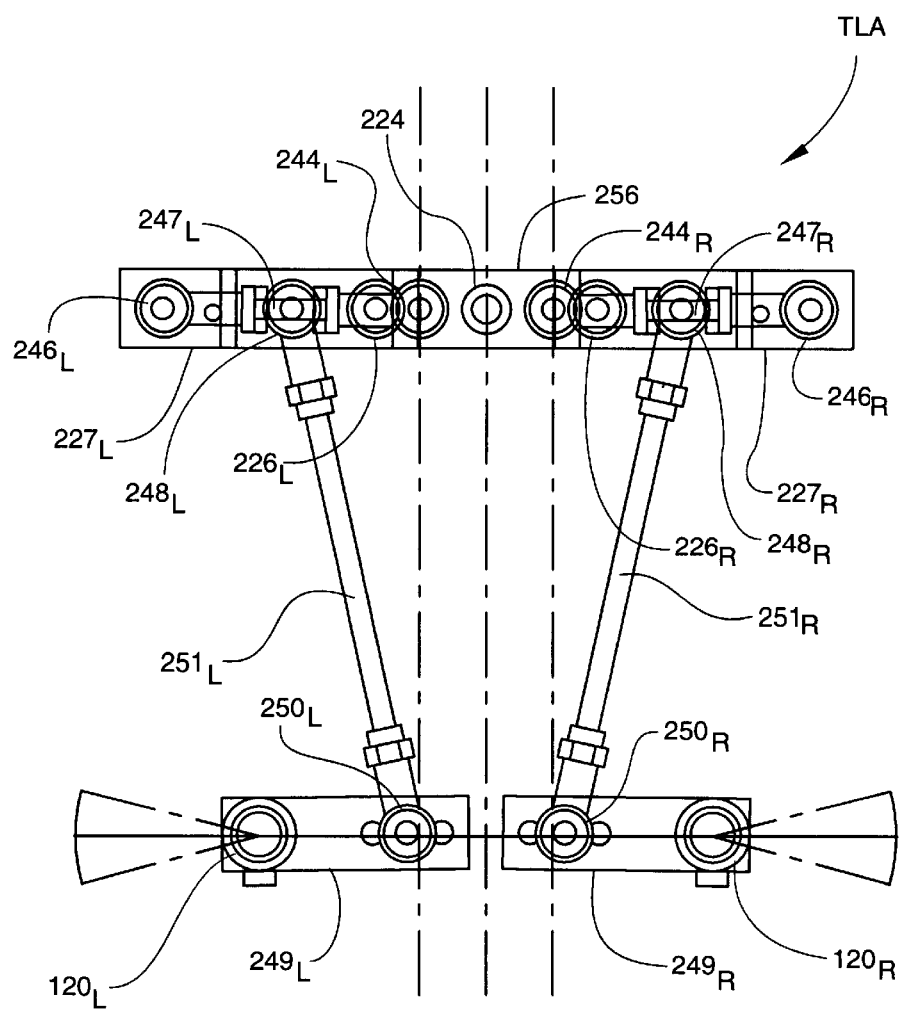
FIG. 20 is a top plan view of a transmission linkage assembly provided with the vehicle, illustrating the transmission linkage assembly in a neutral position.
Figure 21:
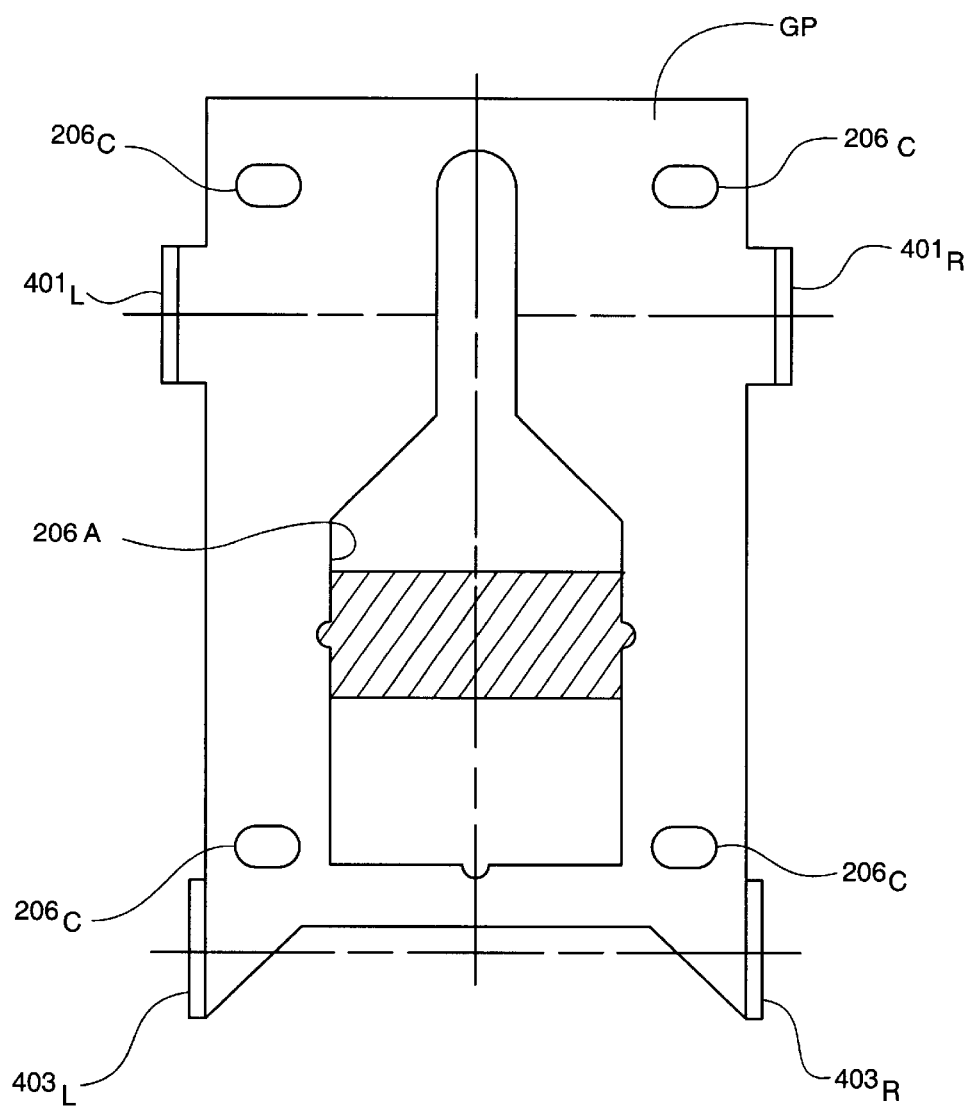
FIG. 21 is a top plan view of the guide plate, highlighting an operative area thereof corresponding to the neutral position.

Referring to FIG. 20, the components of a transmission linkage assembly, generally designated TLA, are illustrated. Transmission linkage assembly TLA provides the actuatable mechanical interface between transmission operating device M and transmission system T, and is controlled by the movements of steering wheel 8 and change lever 10. Transmission linkage assembly TLA comprises mixing lever 224 and its bracket 256; left and right inner ball joints $244_L$, $244_R$; left and right push-pull rods $247_L$, $247_R$; left and right outer ball joints $246_L$, $246_R$; left and right control arms $227_L$, $227_R$; left and right pivot shafts $226_L$, $226_R$; left and right front ball joints $248_L$, $248_R$; left and right push-pull rods $251_L$, $251_R$; left and right rear ball joints $250_L$, $250_R$; left and right transmission speed change arms $249_L$, $249_R$; and left and right swash late shafts $120_L$, $120_R$.

As described hereinabove, longitudinal movement of mixing lever 224 is controlled through the selective positioning of change lever 10 via associated linkages (see, e.g., FIG. 13), and lateral movement of mixing lever 224 is controlled through the selective turning of steering wheel 8 via associated linkages (see, e.g., FIGS. 1, 3 and 5). As also described hereinabove, rotation of left and right swash plate shafts $120_L$, $120_R$ controls the angular position of left and right pump swash plates 117, 117, of left and right continuously variable transmissions $103_L$, $103_R$, respectively (see FIG. 9) and consequently, via associated components, the speed and direction (forward or reverse) of left and right axles $106_L$, $106_R$ (see FIG. 10) and left and right rear wheels $RW_L$, $RW_R$.

Specifically, FIG. 20 illustrates transmission linkage assembly TLA in a neutral position at which vehicle V is stopped. This neutral position corresponds to the neutral position N of change lever 10 illustrated in FIG. 5, position a of mixing lever 224 in FIG. 19, and the neutral/stop area of guide groove 206A of guide member 206 shaded in FIG. 21. In this neutral position, as shown in FIG. 20, left and right push-pull rods $247_L$, $247_R$ are superposed on upper portions of left and right control arms $227_L$, $227_R$, which are extended straight in left and right directions. If steering wheel 8 is turned, for example, in the left direction, guide member 206 starts swinging rightwardly around the pivot 205, 205. However, even if steering wheel 8 is turned to the limit, the left edge of guide groove 206A of guide plate GP of guide member 206 does not abut against mixing lever 224 while mixing lever 224 is in the neutral/stop area. Moreover, left and right guide rails $405_L$, $405_R$ yield in such a way as to be incapable of pushing mixing lever 224 into a position that would engage transmission system T.

In general, when left and right control arms $227_L$, $227_R$ are both moved forward from the neutral position illustrated in FIG. 20, the rotating speed in the normal rotating direction of right and left hydrostatic continuously variable transmissions $103_L$, $103_R$ (see FIG. 9) increases, and vehicle V runs or travels forward at a vehicle speed of, for example, 0 km/h to +5.2 km/h. When left and right control arms $227_L$, $227_R$ are both moved backward from the neutral position, the rotating speed in the reverse rotating direction of left and right hydrostatic continuously variable transmissions $103_L$, $103_R$ increases, and vehicle V runs or travels backward at a vehicle speed of, for example, 0 km/h to −2.4 km/h. When steering wheel 8 is turned, a difference is caused in the moving angle of left and right control arms $227_L$, $227_R$ from the neutral position. In response, outer driving wheel speed $V_o$ is increased and, depending on the longitudinal position of mixing lever 224, inner driving wheel speed $V_i$ is either decreased, stopped, or reversed. As a result, vehicle V is turned. The ZTR condition occurs when the rotation of the inner driving wheel is reversed, which results in vehicle V making a sharp, stationary turn, i.e., swiveling.

Figure 22A:
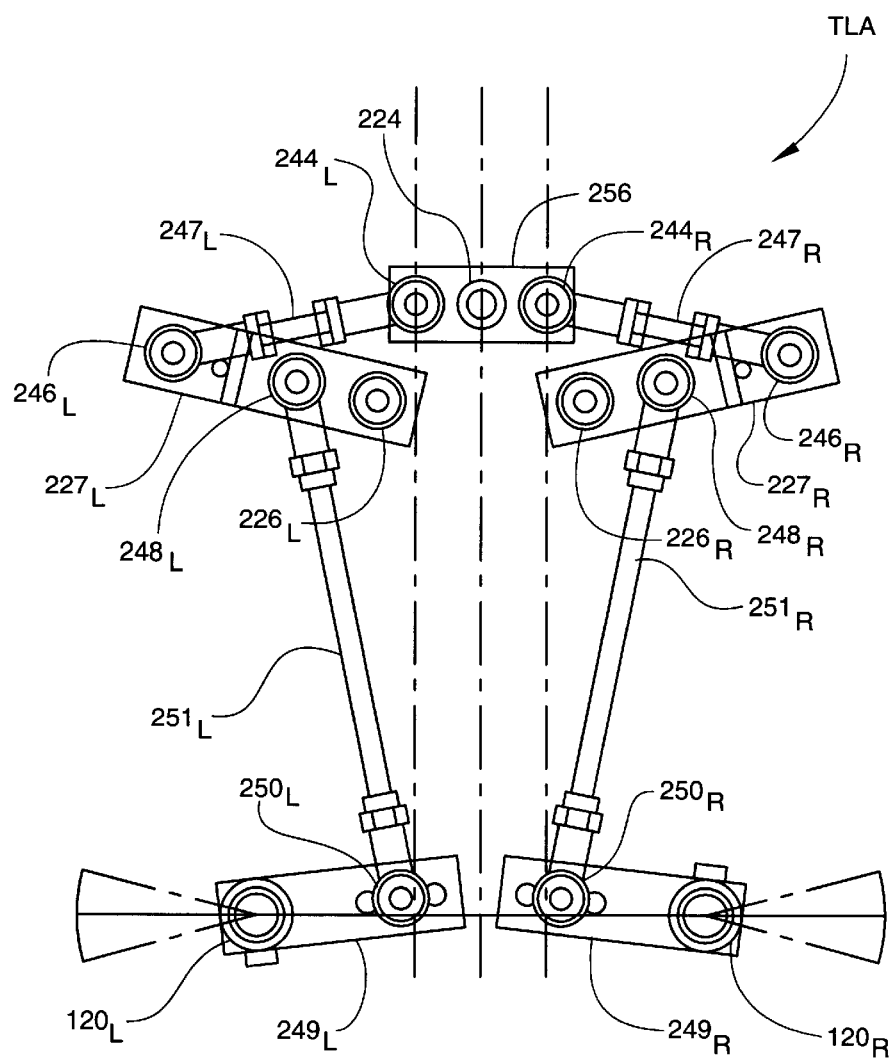
FIG. 22A is a top plan view of the transmission linkage assembly, illustrating the transmission linkage assembly in a normal operating or mowing speed position.

Referring now to FIG. 22A, transmission linkage assembly TLA is illustrated in a straight, forward mowing speed position. The mowing speed position corresponds to forward position $F_1$, of change lever 10 shown in FIG. 5, position b of mixing lever 224 in FIG. 19, and ZTR-capable area of guide groove 206A shaded in FIG. 23A. The mowing speed position can be attained by swinging change lever 10 forwardly from neutral position N to forward position F1 (FIG. 5), which causes rotary shaft 209 connected to change lever 10 (see FIGS. 13–15) to be turned forwardly and mixing lever 224 connected to rotary shaft 209 to also be turned forwardly to position b (FIG. 19). In response, and as shown in FIG. 22A, inner ball joints 244, 244 provided on the upper portion of mixing lever 224 move forwardly, and outer ball joints 246, 246 connected to inner ball joints 244, 244 through push-pull rods $247_L$, $247_R$ are pulled forwardly and inwardly. As a result, left and right control arms $227_L$, $227_R$, whose elongated holes 227A, 227A (see FIG. 14) are pulled at their inner ends by bolts 245, 245 of outer ball joints 246, 246, are swung forwardly through the same angle against neutral spring 231, 231. If left and right control arms $227_L$, $227_R$ swing forwardly through the same angle, i.e., steering wheel 8 is not turned to the left or right, vehicle V runs or travels forwardly in a straight direction at a speed corresponding to the amount of such swing movements (for example, 0 km/hr to +2.5 km/hr).

Figure 22B:
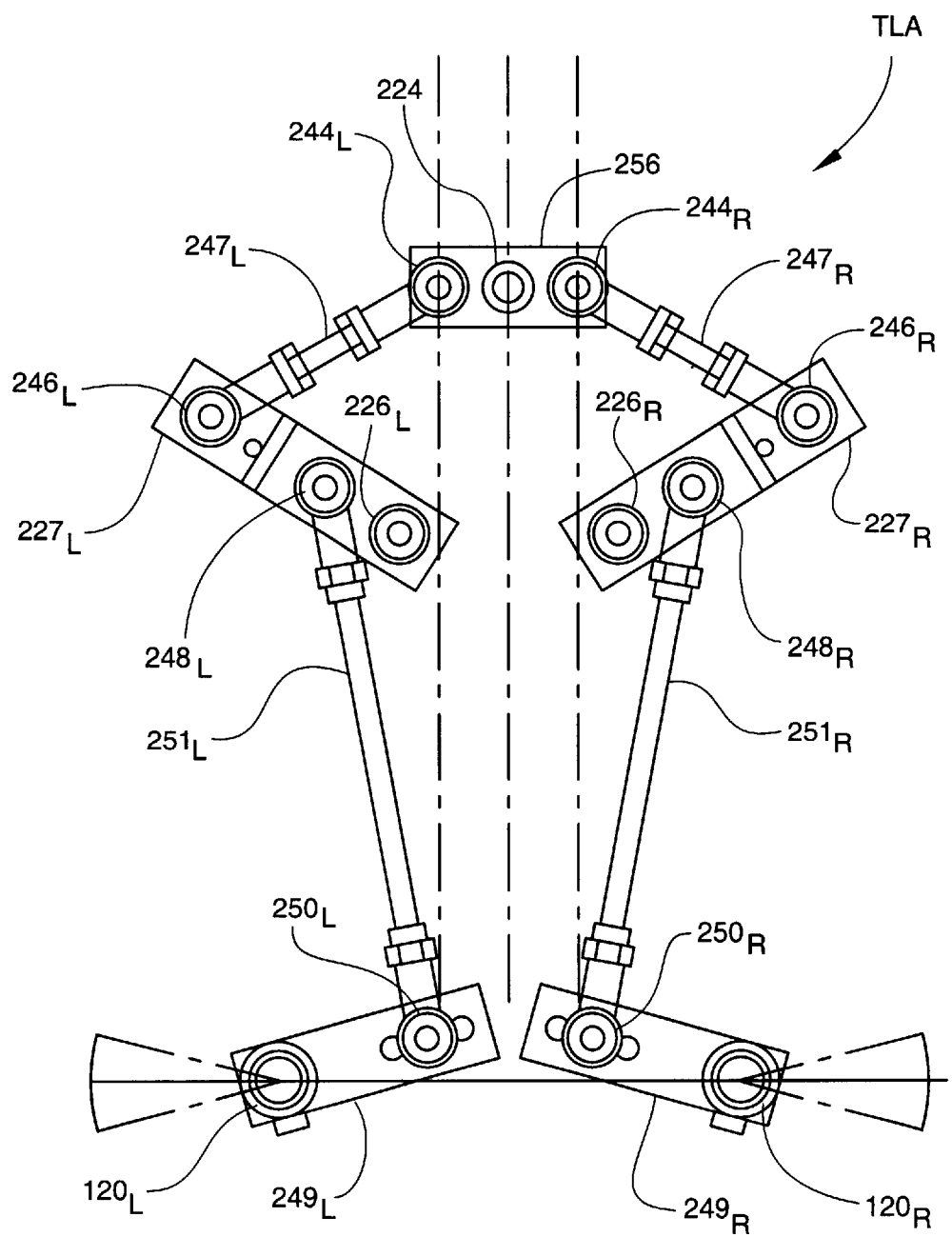
FIG. 22B is a top plan view of the transmission linkage assembly, illustrating the transmission linkage assembly in a transport speed position.

Referring now to FIG. 22B, transmission linkage assembly TLA is illustrated in a forward transport speed position. This transport speed position corresponds to a faster speed of vehicle V as compared to the mowing speed position, and mowing deck MD (FIG. 1), if equipped, is typically not recommended for operation. The transport speed position corresponds to forward position $F_2$ of change lever 10 shown in FIG. 5, position c of mixing lever 224 in FIG. 19, and the traditional steering area of guide groove 206A shaded in FIG. 23B. The transport speed position can be attained by swinging change lever 10 forwardly from neutral position N or forward position $F_1$ to forward position $F_2$ (FIG. 5). As compared to the afore-described mowing speed position, at transport speed position rotary shaft 209 is turned farther forwardly and mixing lever 224 is turned farther forwardly to position c (FIG. 19). In response, and as shown in FIG. 22B, inner ball joints 244, 244 move farther forwardly, and outer ball joints 246, 246 are pulled farther forwardly and farther inwardly. As a result, left and right control arms $227_L$, $227_R$, are swung farther forwardly through the same angle against neutral spring 231, 231. If steering wheel 8 is not turned to the left or right, vehicle V runs or travels forwardly at a greater speed than that corresponding to the mowing speed position (for example, +2.5 km/hr to +5.2 km/hr).

Figure 22C:
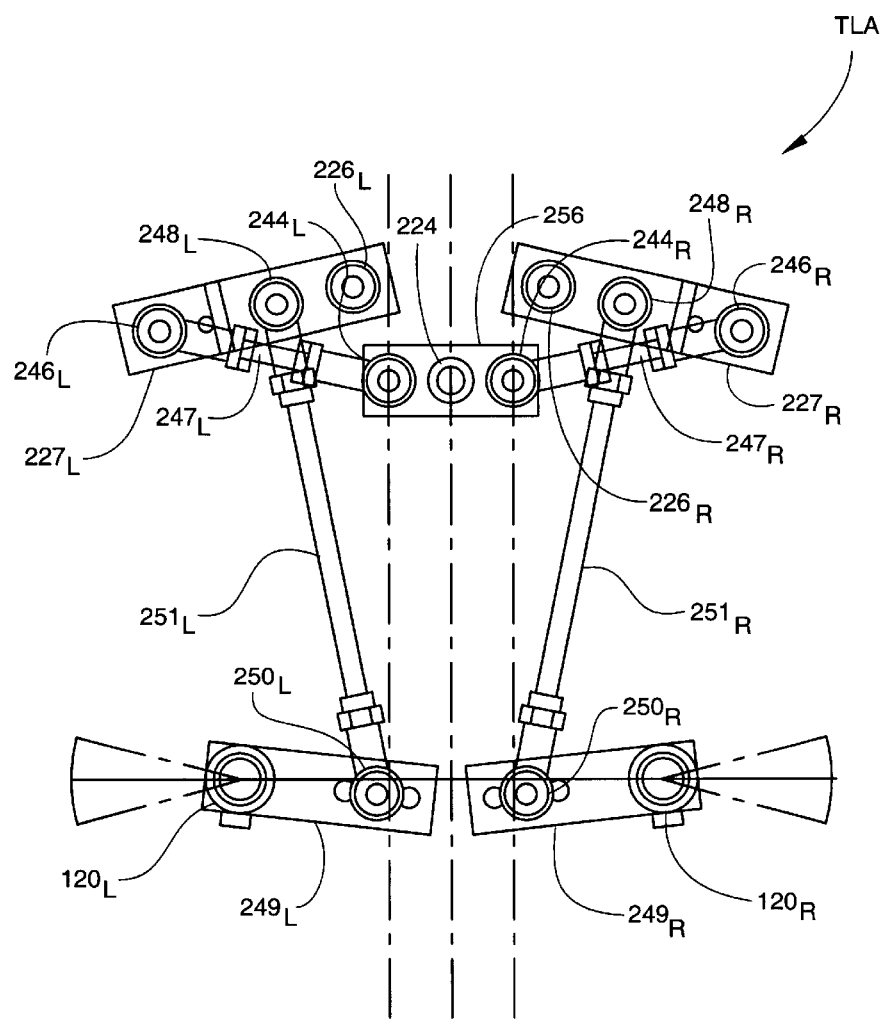
FIG. 22C is a top plan view of the transmission linkage assembly, illustrating the transmission linkage assembly in a reverse speed position.

Referring now to FIG. 22C, transmission linkage assembly TLA is illustrated in a reverse speed position. Mowing deck MD, if equipped, is typically recommended for operation at this reverse speed position. The reverse speed position corresponds to reverse position R of change lever 10 shown in FIG. 5, position d of mixing lever 224 in FIG. 19, and the reverse steering area of guide groove 206A shaded in FIG. 23C. The reverse speed position can be attained by swinging change lever 10 rearwardly from neutral position N to reverse position $F_2$ (FIG. 5). The selection of the reverse position causes left and right control arms $227_L$, $227_R$ to move rearward symmetrically as in forward mowing and transport speed positions, and vehicle V runs or travels backward at a vehicle speed (for example, −2.4 km/h) corresponding to the reverse moved extent of control arms $227_L$, $227_R$ shown in FIG. 22C.

Figure 23A:
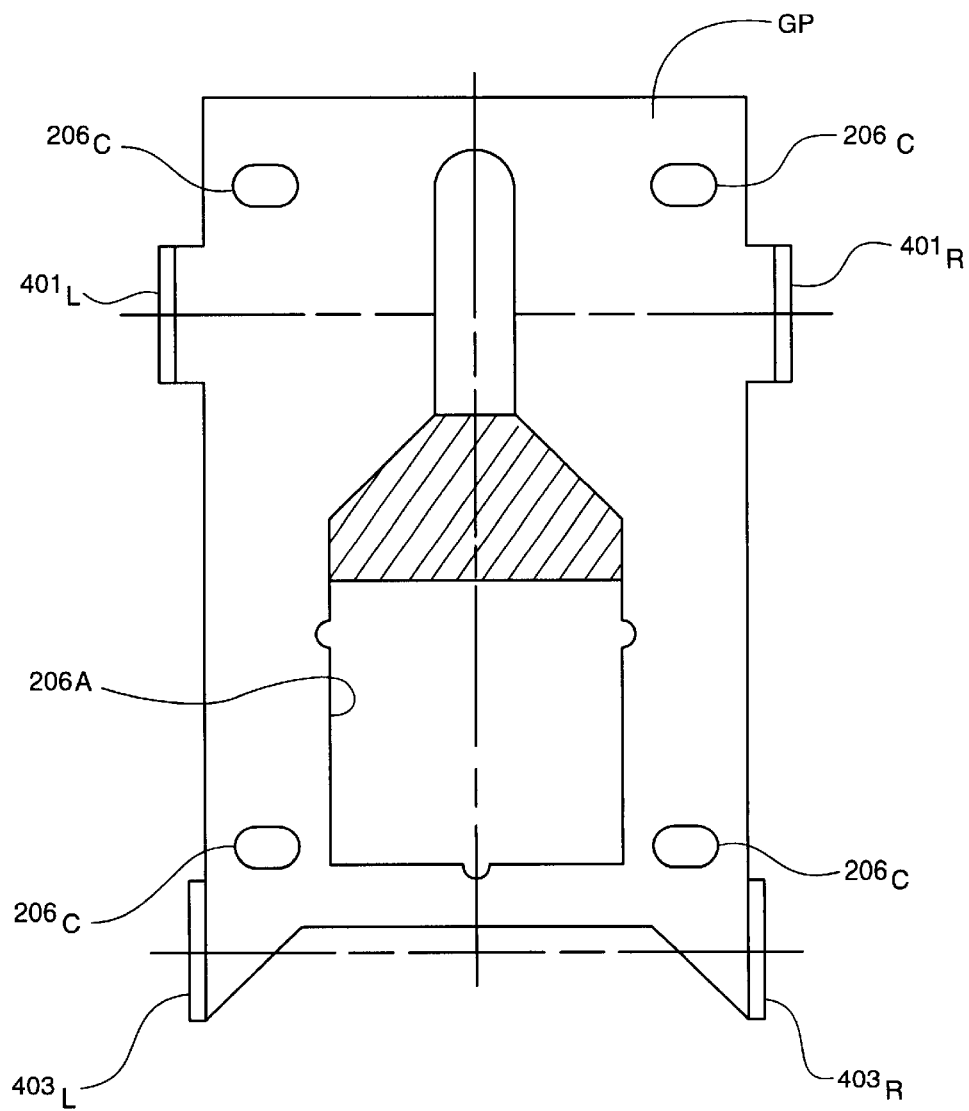
FIG. 23A is a top plan view of the guide plate, highlighting an operative area thereof corresponding to the normal operating or mowing speed position.
Figure 24A:
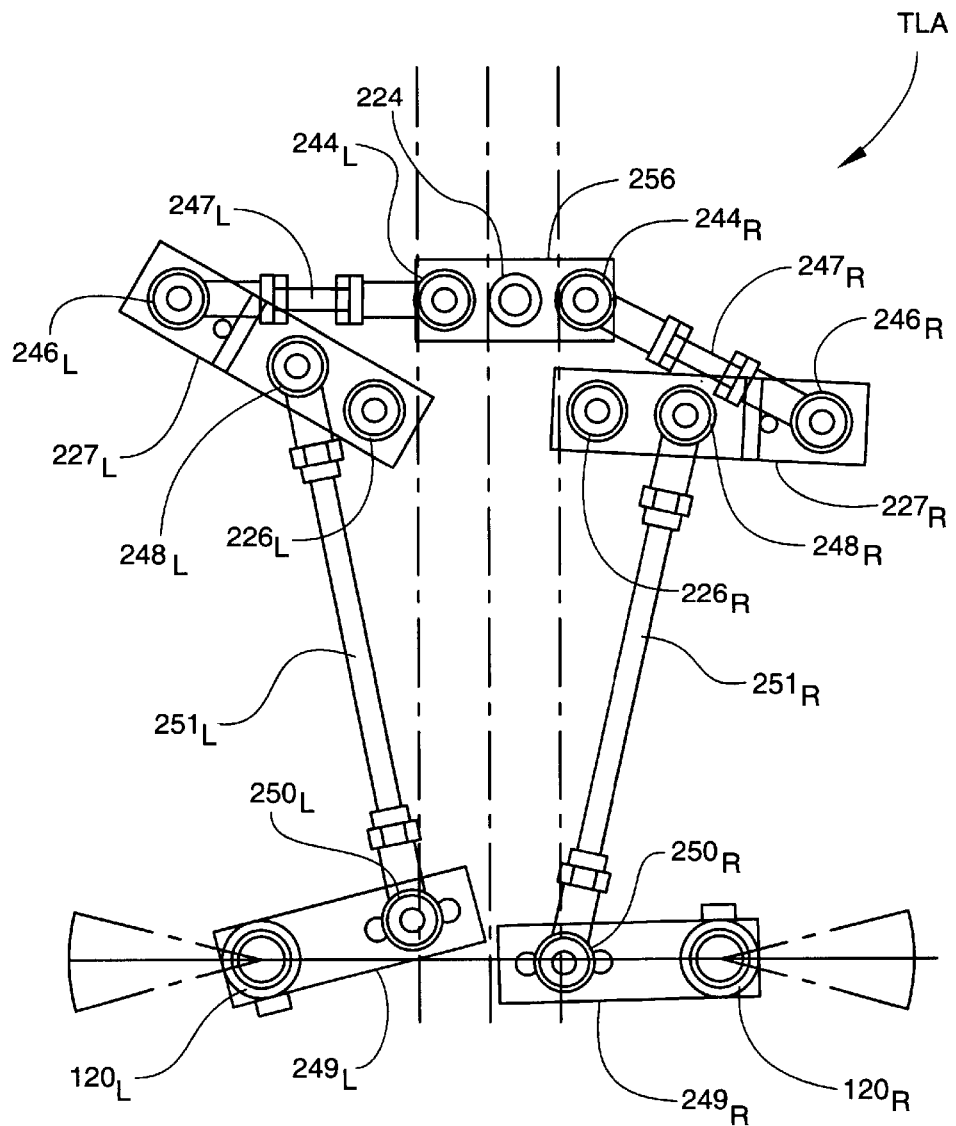
FIG. 24A is a top plan view of the transmission linkage assembly, illustrating the transmission linkage assembly in the normal operating or mowing speed position while the vehicle is being turned to the left.

Referring now to FIG. 24A, transmission linkage assembly TLA is illustrated in the forward mowing speed position after steering wheel 8 has been turned to the left. As described hereinabove with reference to FIG. 14, the turning of steering wheel 8 to the left causes right cable $208_R$ to pull the right side of guide member 206, such that guide member 206 swings clockwise to the right about its pivots 205. As a result, the left side of guide groove 206A of guide plate GP, and left guide rail $GR_L$ (see FIG. 15), begin to move toward guide roller 255 affixed to mixing lever 224. The close proximity of left guide rail $GR_L$ to guide roller 255 ensures that even a slight turning of steering wheel 8 will cause left guide rail $GR_L$ to contact guide roller 255, thereby actuating mixing lever 224 to the right and initiating an essentially immediate turning response in transmission system T. The close proximity of left guide rail $GR_L$ to guide roller 255 is particularly advantageous when front wheels $FW_L$, $FW_R$ are provided as caster wheels, because in this case steering wheel 8 is not linked to front wheels $FW_L$, $FW_R$ and therefore cannot turn front wheels $FW_L$, $FW_R$. Continued turning of steering wheel 8 to the left causes left front and rear guide rail springs $407_L$, $409_L$ to compress, and eventually, at a predetermined turning angle of steering wheel 8, the portion of the left side of guide groove 206A within the ZTR-capable area shaded in FIG. 23A also contacts guide roller 255 to move mixing lever 224 in cooperation with left guide rail $GR_L$.

FIG. 24A illustrates the mechanical response of transmission linkage assembly TLA to the actuation of mixing lever 224 to the right. In comparison to the straight forward position shown in FIG. 22A, in FIG. 24A the turning of steering wheel 8 to the left results in left and right push-pull rods $247_L$, $247_R$ moving rightward. This in turn causes the swinging angle of left control arm $227_L$, which is toward the front of left control arm $227_L$, to increase in response to pulling by left push-pull rod $247_L$ and the swinging angle of right control arm $227_R$, which is toward the front of right control arm $227_R$, to decrease in response to pushing by right push-pull rod $247_R$. Additionally, left push-pull rod $251_L$ pulls left transmission speed change arm $249_L$, rotating left transmission speed change arm $249_L$ and left swash plate shaft $120_L$ counterclockwise. Right push-pull rod $251_R$ pushes right transmission speed change arm $249_R$, rotating right transmission speed change arm $249_R$ and right swash plate shaft $120_R$ counterclockwise.

With such movements, the number of rotations of motor shaft 121 of left hydrostatic continuously variable transmission $103_L$ is increased in order to increase the forward speed of right rear wheel $RW_R$, and the number of rotations of motor shaft 121 of the right hydrostatic continuously variable transmission $103_R$ is decreased to decrease the forward speed of left rear wheel $RW_L$. Moreover, the relative positions of the components of transmission linkage assembly TLA, mixing lever 224, guide plate GP, guide groove 206A, and the internal components of transmission system T, are such that, when mixing lever 224 resides within the ZTR-capable area shown in FIG. 23A, the direction of the angular velocity of left motor shaft 121 is reversed. Consequently, the forward speed of left rear wheel $RW_L$ is not only decreased, it is canceled, and rotation of left rear wheel $RW_L$ switches direction such that left rear wheel $RW_L$ rotates at a reverse speed while right rear wheel $RW_R$ continues to rotate at a forward speed, thereby causing vehicle V to turn at a zero radius, as illustrated in FIG. 25A.

The use of spring-loaded guide rails $GR_L$, $GR_R$ provides the operator of steering wheel 8 with a less abrupt steering feeling and greater control over the response of transmission system T throughout the available steering angle when mixing lever 224 is in the ZTR area. Moreover, the use of spring-loaded guide rails $GR_L$, $GR_R$ provides an important safety feature, in that guide rails $GR_L$, $GR_R$ prevent transmission system T from effecting a ZTR turn in response to initially turning steering wheel 8 by only a few degrees, which could cause an unsuspecting operator to be thrown from vehicle V. These advantages are due at least in part to the fact that guide rails $GR_L$, $GR_R$ push mixing lever 224 in a much more subtle manner as compared to guide plate GP, which is rigid and hence does not yield upon contact with guide roller 255 of mixing lever 224. As steering wheel 8 begins to rotate, for example, to the left, left guide rail springs $401_L$ and $403_L$ begin to compress, and hence left guide rail $GR_L$ yields somewhat to the mechanical resistance offered by mixing lever 224. During this time, transmission system T does not respond to the turning of steering wheel 8 as directly as compared to when guide groove 206A of guide plate GP is pushing on guide roller 255. Consequently, the turning of vehicle V is less severe. As steering wheel 8 continues to rotate, left guide rail springs $401_L$ and $403_L$ continue to compress and store spring energy, and thus the force exerted by left guide rail $GR_L$ on mixing lever 224 grows stronger and the response by transmission system T becomes more direct. Finally, when steering wheel 8 has been turned far enough that guide roller 255 is actually contacted by and being pushed by guide groove 206A, transmission system T is most sensitive to the turning of steering wheel 8. Thus, the tapered width of the open area of guide plate GP, defined between the opposing left and right edges of guide groove 206A corresponding to the ZTR area, results in the control of steering being gradually transitioned from guide rails $GR_L$, $GR_R$ to guide plate GP.

The tapering portions of guide groove 206A corresponding to the ZTR mode shown in FIG. 23A also provide a safety feature. It will be noted that the further forward mixing lever 224 is positioned along the longitudinal direction, the faster is the vehicle speed. Accordingly, if mixing lever 224 is in the upper portion of the ZTR-capable area when steering wheel 8 is turned, the tapered portion of guide groove 206A will contact guide roller 255. Because it is angled with respect to the longitudinal direction, the tapered portion of guide groove 206A will not only push mixing lever 224 laterally to effect a ZTR response, but also push mixing lever 224 rearwardly along the longitudinal direction. As a result, the tapered portion of guide groove 206A causes vehicle V to slow down to a safer speed while making the sharp, abrupt ZTR turn.

Figure 25A:
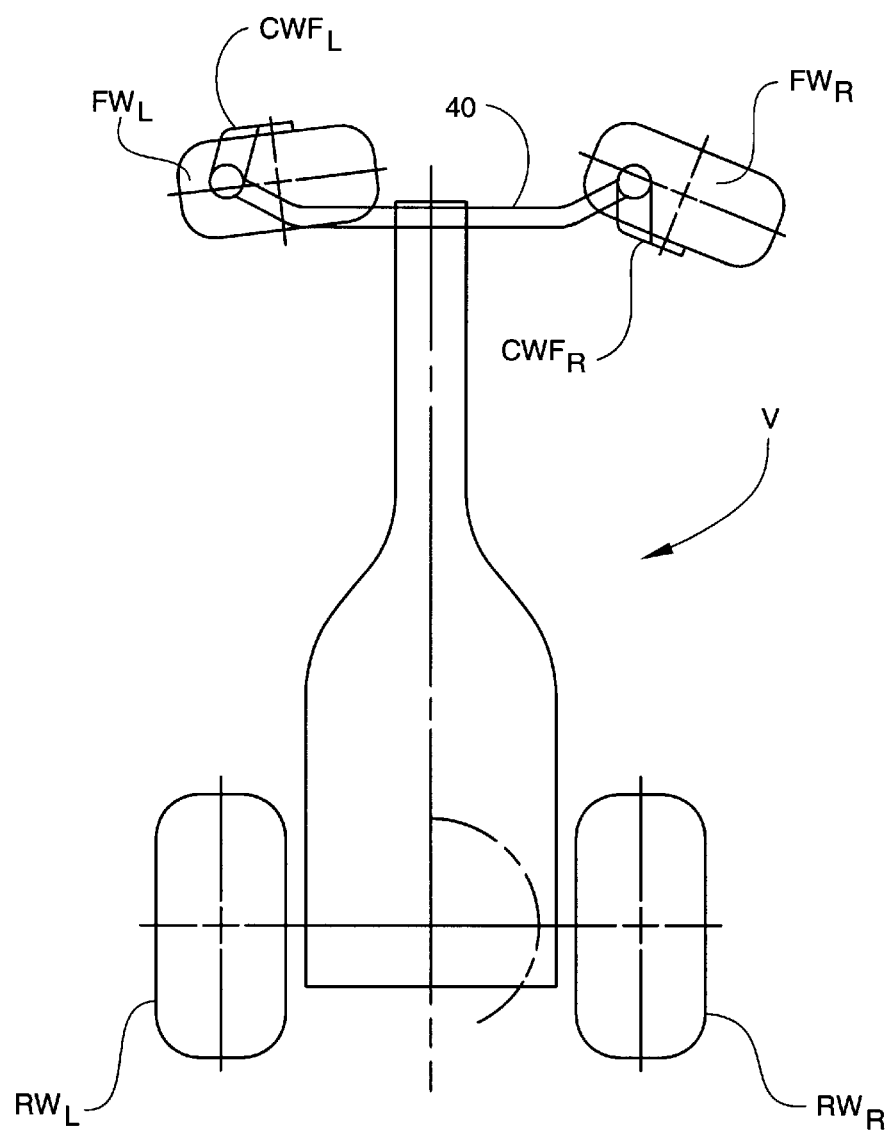
FIG. 25A is a schematic top view of the vehicle, illustrating the orientation of caster wheels provided therewith while the vehicle is moving at the normal operating or mowing speed and being turned to the left.

FIG. 25A schematically illustrates the orientation of front caster wheels $FW_L$, $FW_R$ in relation to vehicle V and rear wheels when vehicle V is turned to the left at a zero radius while traveling at the normal operating or mowing speed. The use of caster wheels in conjunction with ZTR-capable vehicle V is preferred because of their ability to swivel on their own individual vertical axes independently of steering wheel 8, transmission operating device M, and transmission system T. It can be seen in FIG. 25A that front caster wheels $FW_L$, $FW_R$ freely swivel to adapt to the zero radius turn such that front caster wheels $FW_L$, $FW_R$ continue to roll while vehicle V is turning at zero radius. While the invention in some embodiments encompasses the use of conventional, fixed front wheels that are linked to steering wheel 8, in practice it is difficult to provide fixed wheels with the ability to turn in response to ZTR operation to the degree shown in FIG. 25A. Typically, such fixed wheels would drag along the ground while vehicle V executes a zero radius turn.

As previously described, the use of guide rails $GR_L$, $GR_R$, which are positioned on both sides of, and immediately adjacent to, guide roller 255 of mixing lever 224, enables the use of caster wheels for front wheels $FW_L$, $FW_R$, as well as enables the use of the wide area of guide groove 206A in the ZTR, neutral, and reverse modes. This is because a small amount of turning of steering wheel 8 will cause at least some turning response by transmission system T, thereby eliminating a requirement that front wheels $FW_L$, $FW_R$, be operatively linked to steering wheel 8. Without the use of guide rails $GR_L$, $GR_R$, the whole of guide groove 206A would have to be quite narrow in order to enable steering wheel 8 to control transmission system T throughout the intended range of the steering angle. A narrow guide groove 206A, however, would be unsuitable for use in connection with a ZTR-capable vehicle because of the risk that even a slight turning of steering wheel 8 could cause vehicle V to immediately turn severely at a zero turn radius.

Figure 24B:
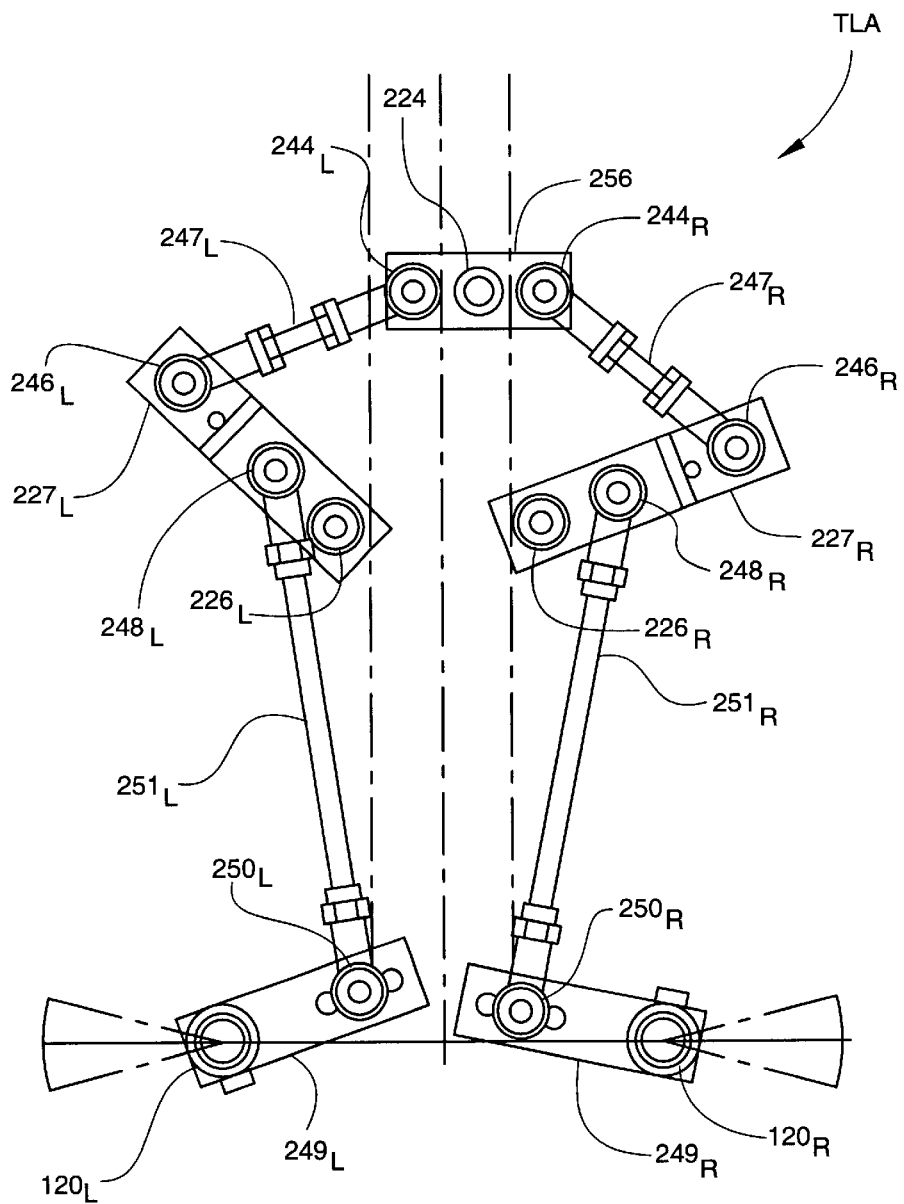
FIG. 24B is a top plan view of the transmission linkage assembly, illustrating the transmission linkage assembly in the transport speed position while the vehicle is being turned to the left.

Referring now to FIG. 24B, transmission linkage assembly TLA is illustrated in the transport speed position after steering wheel 8 has been turned to the left. The movements of right cable $208_R$, guide member 206 (including guide plate GP and left guide rail GRL), and mixing lever 224 in response to the left-hand turning of steering wheel 8 are analogous to that described hereinabove as regards the forward mowing speed position. Moreover, the mechanical response of the various components of transmission linkage assembly TLA shown in FIG. 24B is largely analogous to that shown in FIG. 24A for the mowing speed position, albeit those components have now been actuated to different positions necessary for the internal hydraulics and gearing of transmission system T to drive rear wheels $RW_L$, $RW_R$ at faster rates.

Figure 23B:
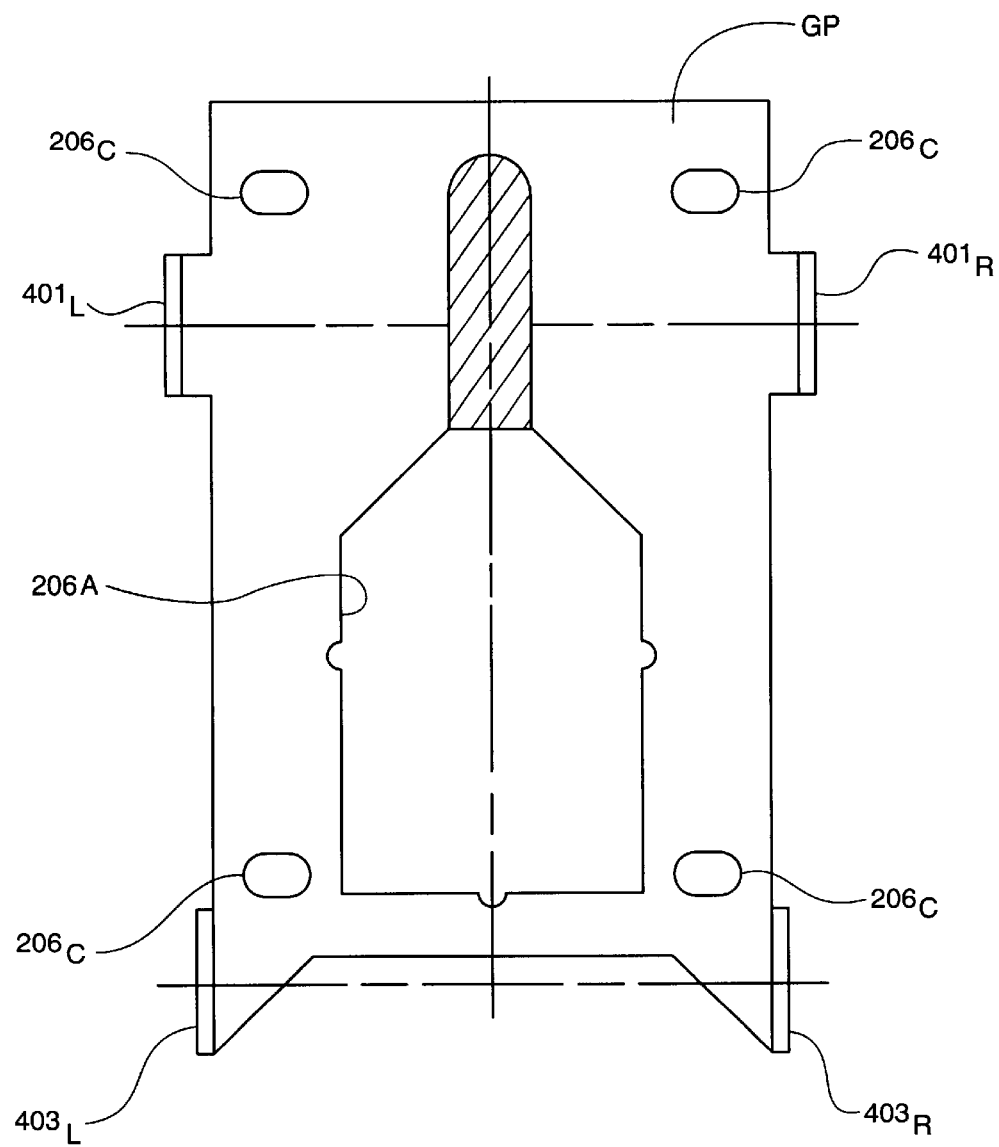
FIG. 23B is a top plan view of the guide plate, highlighting an operative area thereof corresponding to the transport speed position.
Figure 23C:
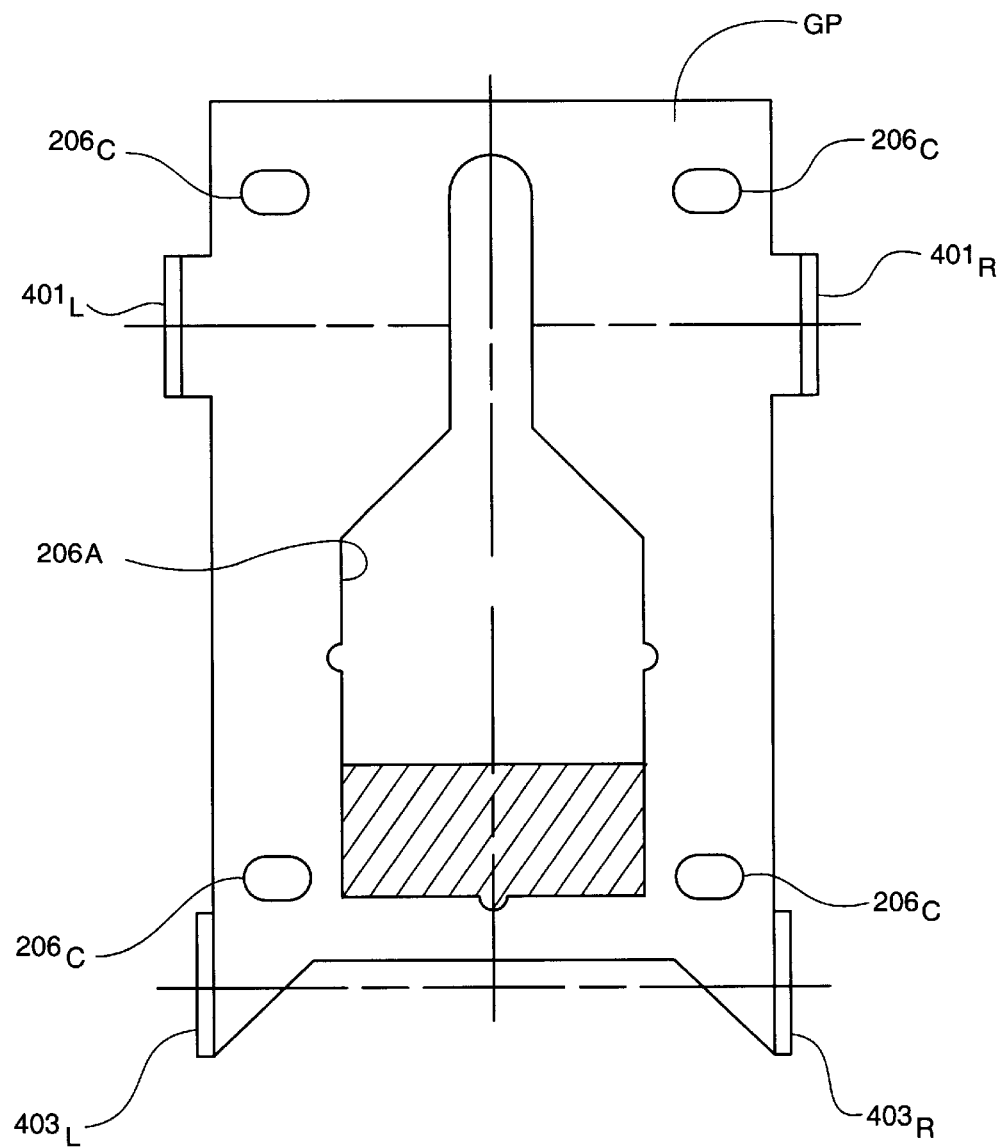
FIG. 23C is a top plan view of the guide plate, highlighting an operative area thereof corresponding to the reverse speed position.

Mixing lever 224, however, now resides in the narrow traditional steering area shown in FIG. 23B, as also depicted, for example, by position c in FIG. 19. It can be seen from FIG. 15 that guide rails $GR_L$, $GR_R$ do not extend into the traditional steering area defined between the opposing left and right forward-most portions of guide groove 206A of guide plate GP. Therefore, the turning of steering wheel 8 to the left immediately results in the left edge of guide groove 206A contacting guide roller 255 of mixing lever 224 and pushing mixing lever 224 rightward. This means that guide plate GP alone controls the steering of vehicle V while transmission system T is in the traditional steering mode and vehicle V is moving at the relatively fast transport speed.

Figure 25B:
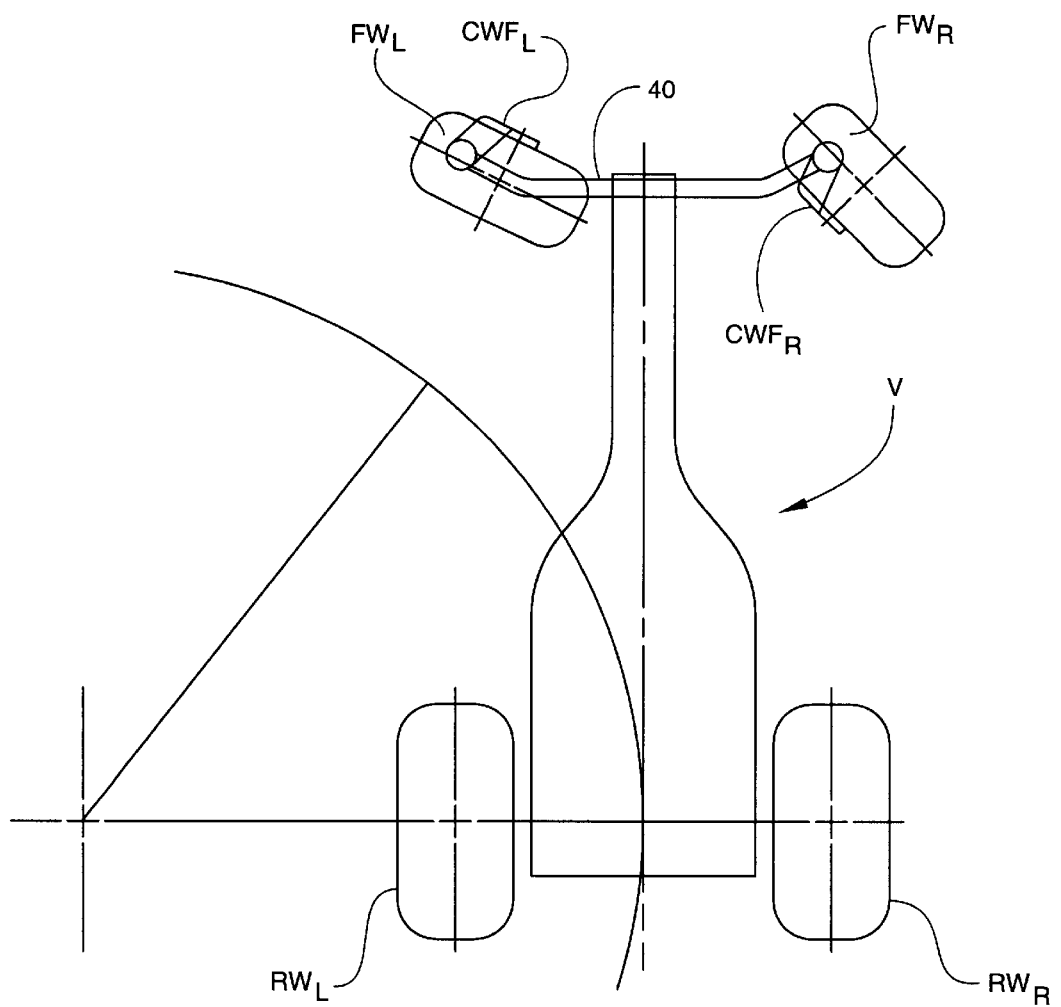
FIG. 25B is a schematic top view of the vehicle, illustrating the orientation of the caster wheels while the vehicle is moving at the transport speed and being turned to the left.

When mixing lever 224 is positioned along any point within the narrow traditional steering area, transmission system T operates in such a manner that both left and right rear wheels $RW_L$, $RW_R$ are always driven at some forward speed, regardless of how much steering wheel 8 is turned to the left or right. In other words, neither left rear wheel $RW_L$ nor right rear wheel $RW_R$ can be made to reverse direction while mixing lever 224 is in the traditional steering area, and thus vehicle V cannot attain ZTR status at these rapid speeds, which is a deliberately designed safety feature. Therefore, vehicle V will be steered in the "traditional" manner, i.e., along an arcuate turning path having an appreciable turning radius. In the present example, with steering wheel 8 turned to the left, vehicle V is turned to the left because transmission system T drives right rear wheel $RW_R$, the outer wheel in this case, faster than left rear wheel $RW_L$, the inner wheel. This result is schematically illustrated in FIG. 25B, where the origin of the turning radius has shifted to a point external to the footprint of vehicle, as compared to the schematic of FIG. 25A.

If, on the other hand, vehicle V is slowed such that mixing lever 224 is at the transition point between the traditional steering area and the widening ZTR-capable area, transmission system T can slow one of left or right rear wheels $RW_L$ or $RW_R$ down to a neutral state in response to the turning of steering wheel 8. This results in a sharper turn of vehicle V than is possible at the faster speeds associated with the traditional steering area. Movement of mixing lever 224 farther down into the ZTR-capable area permits transmission system T to drive one of left or right rear wheels $RW_L$ or $RW_R$ in reverse in order to effect ZTR turning of vehicle V.

Figure 24C:
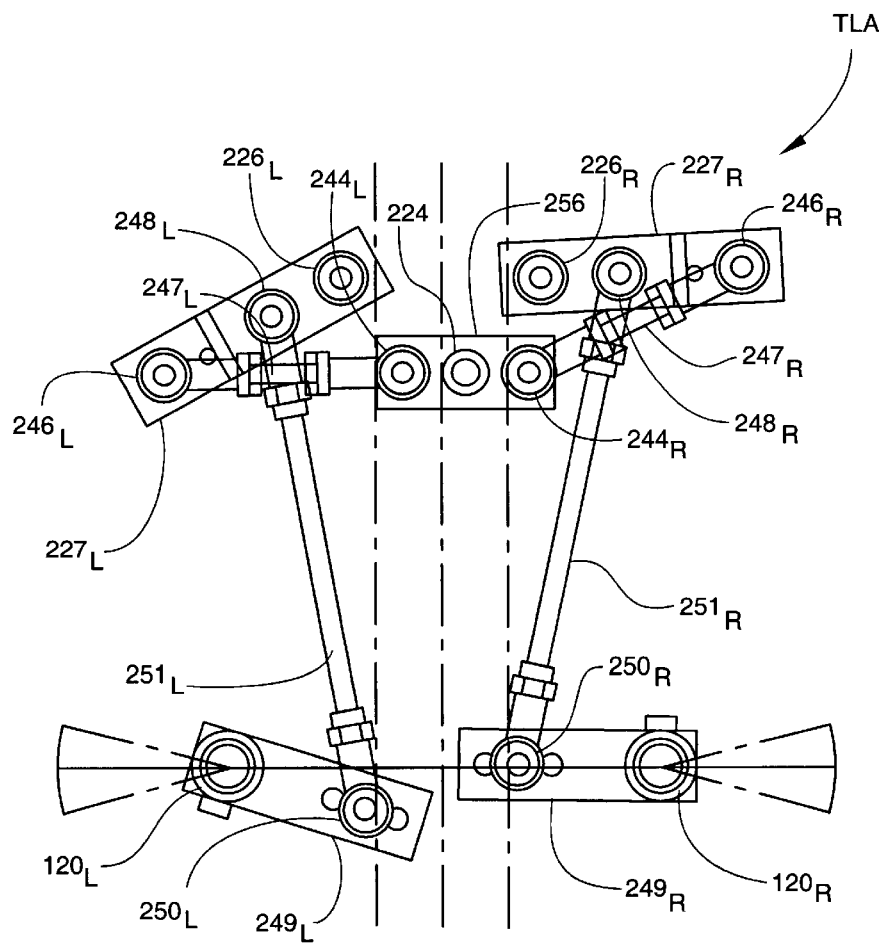
FIG. 24C is a top plan view of the transmission linkage assembly, illustrating the transmission linkage assembly in the reverse speed position while the vehicle is being turned to the left.
Figure 25C:
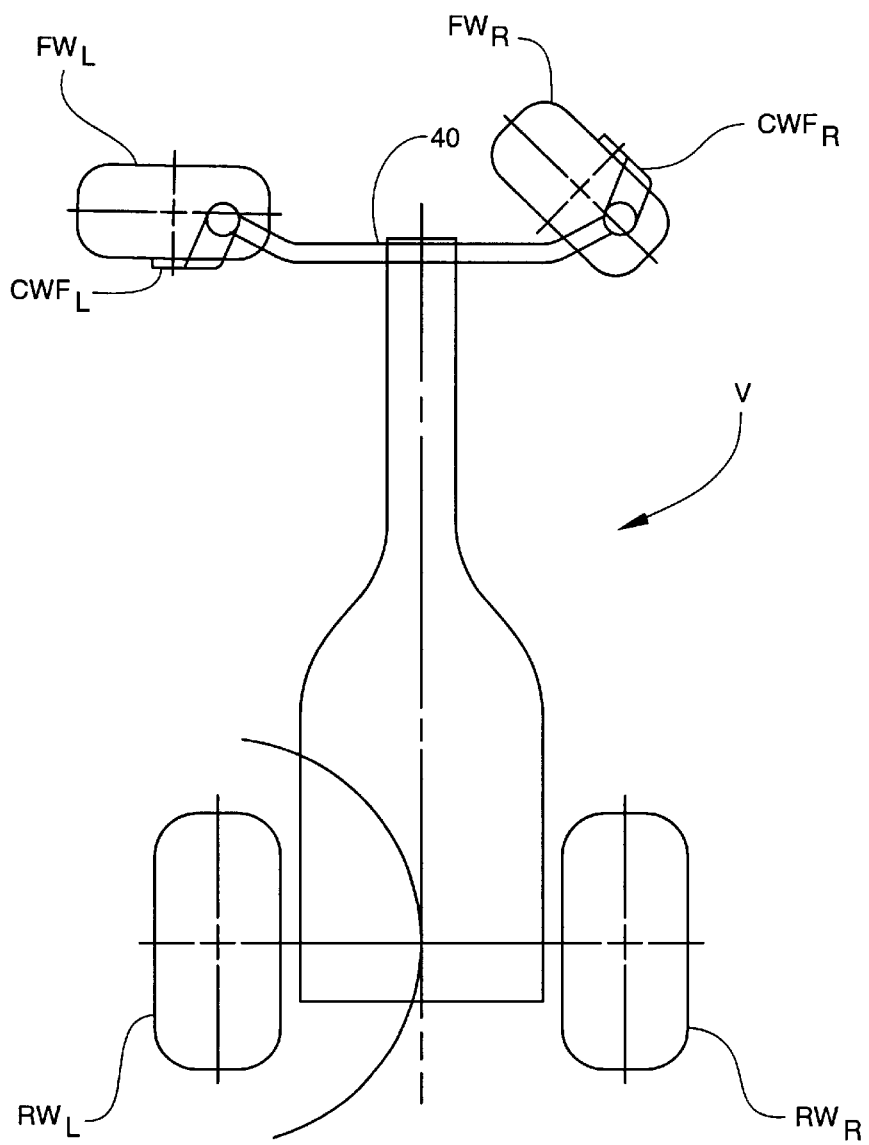
FIG. 25C is a schematic top view of the vehicle, illustrating the orientation of the caster wheels while the vehicle is moving at the reverse speed and being turned to the left.

Referring now to FIG. 24C, transmission linkage assembly TLA is illustrated in the reverse speed position after steering wheel 8 has been turned to the left. The movements of right cable $208_R$, guide member 206 (including guide plate GP and left guide rail $GR_L$), and mixing lever 224 in response to the left-hand turning of steering wheel 8 are analogous to that described hereinabove as regards the forward mowing speed position. Moreover, the mechanical response of the various components of transmission linkage assembly TLA shown in FIG. 24C is largely analogous to that shown in FIG. 24A for the mowing speed position, albeit those components have now been actuated to different positions necessary for the internal hydraulics and gearing of transmission system T to drive rear wheels $RW_L$, $RW_R$ in the reverse direction. With steering wheel 8 turned to the left while mixing lever 224 is in the reverse mode, right rear wheel $RW_R$ (the outer wheel in this case) is driven at a greater reverse speed than left rear wheel $RW_L$ (the inner wheel). The reverse mode therefore functions in the same manner as the mowing mode, except that the reverse steering area shown in FIG. 24C, defined between the rearmost left and right edges of guide groove 206A or guide plate GP, has a constant, relatively large width and thus no tapering or transition area. Guide rails $GR_L$, $GR_R$ control steering in this entire area. Depending on such factors as the spring constants of guide rail springs $407_L$, $407_R$, $409_L$, $409_R$ (and particularly left and right rear guide rail springs $409_L$, $409_R$), and the lengths of push-pull rods $247_L$, $247_R$, $251_L$, $251_R$, the reverse mode can be set to operate in a traditional steering manner or in a ZTR mode. The turning of vehicle V at a zero turn radius while traveling in reverse is schematically illustrated in FIG. 25C.

While the operation of steering wheel 8 only in a leftward direction has been described hereinabove, it will be appreciated by persons skilled in the art that the effect the operation of transmission system T and the responsive turning of vehicle V when steering wheel 8 is operated in a rightward direction is substantially analogous.

Instead of the four-wheeled vehicle shown in the embodiment, the present invention can also be applied to a three-wheeled vehicle having a pair of transmission-driven rear wheels and a single, non-driven front wheel that is either steered or is a caster wheel; a four-wheeled vehicle in which the front wheels are the transmission-driven wheels and the rear wheels are non-driven wheels that are either steered or are caster wheels; a three-wheeled vehicle in which the front wheels are the transmission-driven wheels and a single, non-driven rear is either steered or is a caster wheel; and a vehicle in which driving wheel or wheels is a crawler or crawlers. For a vehicle having a crawler, the driving wheel speed corresponds to a speed of a wheel for driving the crawler.

Although a round steering wheel having a large rotational angle has been described in the embodiment, a steering bar having a small rotational angle may be used.

Additionally, although the transmission having two pumps and two motors is described in the embodiment, the present invention can be applied to a transmission having one pump and two motors. If the latter transmission is employed, a pump swash plate of a hydraulic pump may be controlled instead of controlling the motor swash plate of the hydraulic motor.

Furthermore, in the embodiment, although the continuously variable transmissions $103_L$, $103_R$ has been described as hydrostatic continuously variable transmissions, any type of continuously variable transmission such as belt-type continuously variable transmission, cone-type continuously variable transmission, frictional type continuously variable transmission and the like may be employed instead of hydrostatic continuously variable transmissions $103_L$, $103_R$.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A steering control apparatus for a vehicle, comprising:
   (a) a movable steering handle;
   (b) first and second CVT devices for independently driving first and second drive wheels, respectively;
   (c) a transmission control device interconnecting the steering handle and the first and second CVT devices, and comprising a mixing lever for controlling operations of the first and second CVT devices; and
   (d) first and second guide members disposed on opposite sides of the mixing lever, wherein movement of the steering handle in a first steering direction causes the first guide member to move the mixing lever in a first actuating direction and movement of the steering handle in a second steering direction causes the second guide member to move the mixing lever in a second actuating direction.

2. The apparatus according to claim 1 comprising a steering linkage assembly interconnecting the steering handle and the transmission control device.

3. The apparatus according to claim 2 wherein the transmission control device comprises a movable guide plate communicating with the steering linkage assembly, and wherein movement of the steering handle in the first steering direction causes the guide plate to move the mixing lever in the first actuating direction, and movement of the steering handle in the second steering direction causes the guide plate to move the mixing lever in the second actuating direction.

4. The apparatus according to claim 3 wherein the steering linkage assembly comprises first and second cables interconnecting the steering handle to the guide plate.

5. The apparatus according to claim 3 wherein the guide plate is pivotable about a longitudinal axis.

6. The apparatus according to claim 5 comprising first and second axles respectively communicating with the first and second CVT devices for transmitting torque to the first and second drive wheels, the first and second axles being rotatable about a lateral axis generally transverse to the longitudinal axis.

7. The apparatus according to claim 1 comprising first and second axles respectively communicating with the first and second CVT devices for transmitting torque to the first and second drive wheels, the first and second axles being rotatable about a lateral axis generally transverse to a longitudinal axis about which the first and second guide members and mixing lever are movable.

8. The apparatus according to claim 1 wherein the transmission control device comprises a pivotable guide plate communicating with the steering handle, the guide plate comprises a guide groove defining an aperture through the guide plate, the guide groove includes first and second groove edges, and the mixing lever extends through the aperture, and wherein movement of the steering handle beyond a set value in the first steering direction causes the first groove edge to move the mixing lever in the first actuating direction, and movement of the steering handle beyond a set value in the second steering direction causes the second groove edge to move the mixing lever in the second actuating direction.

9. The apparatus according to claim 8 wherein the first and second guide members are positioned relative to the guide plate for contacting the mixing lever prior to the first and second groove edges in response to movement of the steering handle.

10. The apparatus according to claim 8 wherein the first and second guide members are mounted to the guide plate.

11. The apparatus according to claim 8 wherein the aperture comprises a narrow end area, a wide end area, a wide medial area adjacent to the wide end area, and a tapering area between the narrow area and the medial wide area, and wherein the mixing lever is selectively positionable in each area.

12. The apparatus according to claim 11 wherein the guide members are disposed above the wide end area, the wide medial area, and the tapering area.

13. The apparatus according to claim 11 comprising a change lever communicating with the mixing lever for selectively positioning the mixing lever in the narrow end area, the tapering area, the wide medial area, and the wide end area.

14. The apparatus according to claim 11 wherein the mixing lever communicates with the first and second CVT devices such that the first and second CVT devices are neutral when the mixing lever is positioned in the medial wide area, the first and second CVT devices actively drive the first and second drive wheels in a first forward speed range when the mixing lever is positioned in the tapering area, the first and second CVT devices actively drive the first and second drive wheels in a second forward speed range when the mixing lever is positioned in the narrow end area, and the first and second CVT devices actively drive the first and second drive wheels in a reverse speed range when the mixing lever is positioned in the wide end area.

15. The apparatus according to claim 11 wherein the mixing lever communicates with the first and second CVT devices such that, when the mixing lever is positioned in the tapering area of the guide plate aperture, one of the CVT devices drives one of the drive wheels in a forward direction and the other CVT device simultaneously drives the other drive wheel in a reverse direction in response to movement of the steering handle beyond a set value in either the first or second steering direction.

16. The apparatus according to claim 1 comprising first and second speed change arms communicating with the mixing lever for respectively moving first and second swash plates within the first and second CVT devices, wherein movement of the mixing lever actuates at least one of the speed change arms.

17. The apparatus according to claim 1 comprising a change lever communicating with the mixing lever for pivoting the mixing lever into selected transmission drive positions.

18. The apparatus according to claim 17 wherein the change lever is connected to the mixing lever for movement thereof in a longitudinal direction, and the first and second guide members are oriented relative to the mixing lever for movement thereof in a lateral direction substantially transverse to the longitudinal direction.

19. The apparatus according to claim 1 wherein the first and second guide members are spring-loaded.

20. A steering control apparatus for a vehicle, comprising:
(a) a movable steering handle;
(b) first and second CVT devices for independently driving first and second drive wheels, respectively;
(c) a guide plate communicating with the steering handle and pivotable thereby, the guide plate comprising a guide groove defining an aperture, the aperture comprising a narrow end area, a wide end area, a wide medial area adjacent to the wide end area, and a tapering area between the narrow area and the medial wide area, the guide groove including first and second groove edges; and
(d) a mixing lever extending through the aperture and selectively positionable in each area of the guide plate aperture, the mixing lever connected to the first and second CVT devices for controlling respective operations thereof, wherein movement of the steering handle in a first steering direction causes the first groove edge to move the mixing lever in a first actuating direction, and movement of the steering handle in a second steering direction causes the second groove edge to move the mixing lever in a second actuating direction.

21. The apparatus according to claim 20 comprising a steering linkage assembly interconnecting the steering handle and the guide plate.

22. The apparatus according to claim 21 wherein the steering linkage assembly comprises first and second cables interconnecting the steering handle to the guide plate.

23. The apparatus according to claim 20 wherein a lateral width of the narrow end area is slightly greater than a diameter of a contactable portion of the mixing lever adjacent to a section of the guide groove corresponding to the narrow end area.

24. The apparatus according to claim 23 wherein a gap is defined in each of the first and second actuating directions between the contactable portion of the mixing lever and the section of the guide groove corresponding to the narrow end area when the mixing lever is positioned in the narrow end area.

25. The apparatus according to claim 24 wherein the gap ranges from approximately 0 to approximately 2 mm.

26. The apparatus according to claim 20 comprising first and second guide members disposed on opposite sides of the mixing lever, wherein movement of the steering handle in the first steering direction causes the first guide member to move the mixing lever in the first actuating direction and movement of the steering handle in the second steering direction causes the second guide member to move the mixing lever in the second actuating direction.

27. The apparatus according to claim 26 wherein the first and second guide members are spring-loaded.

28. The apparatus according to claim 26 wherein the first and second guide members are positioned relative to the guide plate for contacting the mixing lever prior to the first and second groove edges in response to movement of the steering handle.

29. The apparatus according to claim 26 wherein the first and second guide members are mounted to the guide plate.

30. The apparatus according to claim 26 wherein the guide members are disposed above the wide end area, the wide medial area, and the tapering area of the guide plate aperture.

31. The apparatus according to claim 20 comprising a change lever communicating with the mixing lever for selectively positioning the mixing lever in the narrow end area, the tapering area, the wide medial area, and the wide end area of the guide plate aperture.

32. The apparatus according to claim 31 wherein the change lever is connected to the mixing lever for movement thereof in a longitudinal direction, and the first and second guide members are oriented relative to the mixing lever for movement thereof in a lateral direction substantially transverse to the longitudinal direction.

33. The apparatus according to claim 20 wherein the mixing lever communicates with the first and second CVT devices such that the first and second CVT devices are neutral when the mixing lever is positioned in the medial wide area, the first and second CVT devices actively drive the first and second drive wheels in a first forward speed range when the mixing lever is positioned in the tapering area, the first and second CVT devices actively drive the first and second drive wheels in a second forward speed range when the mixing lever is positioned in the narrow end area, and the first and second CVT devices actively drive the first and second drive wheels in a reverse speed range when the mixing lever is positioned in the wide end area.

34. The apparatus according to claim 20 wherein the mixing lever communicates with the first and second CVT devices such that, when the mixing lever is positioned in the tapering area of the guide plate aperture, one of the CVT devices drives one of the drive wheel in a forward direction and the other CVT device simultaneously drives the other drive wheel in a reverse direction in response to movement of the steering handle beyond a set value in either the first or second steering direction.

35. A vehicle with transmission-controlled steering, comprising:
(a) a movable steering handle;
(b) first and second drive wheels;
(c) first and second CVT devices for independently driving the first and second drive wheels, respectively;
(d) a transmission control device interconnecting the steering handle and the first and second CVT devices, and comprising a mixing lever for controlling operations of the first and second CVT devices; and
(e) first and second guide members disposed on opposite sides of the mixing lever, wherein movement of the steering handle in a first steering direction causes the first guide member to move the mixing lever in a first actuating direction, and movement of the steering handle in a second steering direction causes the second guide member to move the mixing lever in a second actuating direction.

36. The vehicle according to claim 35 wherein the vehicle is a lawnmower.

37. The vehicle according to claim 35 comprising a caster wheel turnable independently of the steering handle.

38. The vehicle according to claim 37 comprising a frame and a pair of caster wheels mounted to one end region of the frame, wherein the first and second drive wheels are mounted to an opposite end region of the frame.

39. The vehicle according to claim 35 wherein the transmission control device comprises a pivotable guide plate communicating with the steering handle, the guide plate comprises a guide groove defining an aperture through the guide plate, the guide groove includes first and second groove edges, and the mixing lever extends through the aperture, and wherein movement of the steering handle beyond a set value in the first steering direction causes the first groove edge to move the mixing lever in the first actuating direction and movement of the steering handle beyond a set value in the second steering direction causes the second groove edge to move the mixing lever in the second actuating direction.

40. The vehicle according to claim 39 wherein the aperture comprises a narrow end area, a wide end area, a wide medial area adjacent to the wide end area, and a tapering area between the narrow area and the medial wide area, and wherein the mixing lever is selectively positionable in each area.

41. The vehicle according to claim 40 wherein the mixing lever communicates with the first and second CVT devices such that the first and second CVT devices are neutral when the mixing lever is positioned in the medial wide area, the first and second CVT devices actively drive the first and second drive wheels in a first forward speed range when the mixing lever is positioned in the tapering area, the first and second CVT devices actively drive the first and second drive wheels in a second forward speed range when the mixing lever is positioned in the narrow end area, and the first and second CVT devices actively drive the first and second drive wheels in a reverse speed range when the mixing lever is positioned in the wide end area.

42. The vehicle according to claim 40 wherein the mixing lever communicates with the first and second CVT devices such that, when the mixing lever is positioned in the tapering area of the guide plate aperture, one of the CVT devices drives one of the drive wheel in a forward direction and the other CVT device simultaneously drives the other drive wheel in a reverse direction in response to movement of the steering handle beyond a set value in either the first or second steering direction.

43. The vehicle according to claim 35 wherein the first and second guide members are spring-loaded.

44. A vehicle with transmission-controlled steering, comprising:
    (a) a movable steering handle;
    (b) first and second drive wheels;
    (c) first and second CVT devices for independently driving the first and second drive wheels, respectively;
    (d) a guide plate communicating with the steering handle and pivotable thereby, the guide plate comprising a guide groove defining an aperture, the aperture comprising a narrow end area, a wide end area, a wide medial area adjacent to the wide end area, and a tapering area between the narrow area and the medial wide area, the guide groove including first and second groove edges; and
    (e) a mixing lever extending through the aperture and selectively positionable in each area of the guide plate aperture, the mixing lever connected to the first and second CVT devices for controlling respective operations thereof, wherein movement of the steering handle in a first steering direction causes the first groove edge to move the mixing lever in a first actuating direction and movement of the steering handle in a second steering direction causes the second groove edge to move the mixing lever in a second actuating direction.

45. The vehicle according to claim 44 wherein the vehicle is a lawnmower.

46. The vehicle according to claim 44 comprising a caster wheel turnable independently of the steering handle.

47. The vehicle according to claim 46 comprising a frame and a pair of caster wheels mounted to one end region of the frame, wherein the first and second drive wheels are mounted to an opposite end region of the frame.

48. The vehicle according to claim 44 comprising first and second biased guide members disposed on opposite sides of the mixing lever, wherein movement of the steering handle in the first steering direction causes the first guide member to move the mixing lever in the first actuating direction and movement of the steering handle in the second steering direction causes the second guide member to move the mixing lever in the second actuating direction.

49. The vehicle according to claim 44 wherein the mixing lever communicates with the first and second CVT devices such that the first and second CVT devices are neutral when the mixing lever is positioned in the medial wide area, the first and second CVT devices actively drive the first and second drive wheels in a first forward speed range when the mixing lever is positioned in the tapering area, the first and second CVT devices actively drive the first and second drive wheels in a second forward speed range when the mixing lever is positioned in the narrow end area, and the first and second CVT devices actively drive the first and second drive wheels in a reverse speed range when the mixing lever is positioned in the wide end area.

50. The vehicle according to claim 44 wherein the mixing lever communicates with the first and second CVT devices such that, when the mixing lever is positioned in the tapering area of the guide plate aperture, one of the CVT devices drives one of the drive wheel in a forward direction and the other CVT device simultaneously drives the other drive wheel in a reverse direction in response to movement of the steering handle beyond a set value in either the first or second steering direction.

51. A method for steering a vehicle, comprising the steps of:
    (a) coupling output power produced by a motor to first and second drive wheels through first and second CVT devices, respectively; and
    (b) moving a steering handle in a selected steering direction to pivot a transmission control device comprising first and second guide members and a mixing lever extending between the first and second guide members, whereby one of the guide members moves the mixing lever and movement of the mixing lever causes the first CVT device to drive the first drive wheel at a first angular velocity and the second CVT device to drive the second drive wheel at a second angular velocity different from the first angular velocity.

52. The method according to claim 51 wherein the first angular velocity at which the first CVT device drives the first drive wheel has a forward direction component and the second angular velocity at which the second CVT device drives the second drive wheel has a reverse direction component, whereby the vehicle is steered according to a zero turn radius.

53. The method according to claim 51 wherein the transmission control device comprises a guide plate pivotable therewith, the guide plate comprises a guide groove defining an aperture through the guide plate, the guide groove comprises first and second opposing groove edges, and the mixing lever extends through the aperture between the groove edges, and wherein the method comprises the step of moving the steering handle beyond a set value in the selected steering direction to cause one of the groove edges to move the mixing lever in cooperation with the one guide member.

54. The method according to claim 53 wherein the guide groove defines a plurality of distinct operating areas of the aperture, and comprising the step of positioning the mixing lever at a selected one of the operating areas to select a running speed and an alternative forward or backward direction of movement for the vehicle during turning of the vehicle.

55. The method according to claim 54 wherein the aperture comprises a narrow-width area and a tapering-width area, the narrow-width area is disposed relative to the mixing lever so as to prevent the vehicle from being steered at zero turn radius when the mixing lever is positioned within the narrow-width area, and the tapering-width area is disposed relative to the mixing lever so as to permit the vehicle to be steered at zero turn radius when the mixing lever is positioned within the tapering-width area.

56. The method according to claim 54 wherein the aperture comprises a tapering-width area, and movement of the steering handle in the selected direction while the mixing lever is positioned in the tapering-width area causes one of the guide groove edges corresponding to the tapering-width area to move the mixing lever in both a transverse direction and a longitudinal direction, whereby the vehicle is both steered and slowed.

57. The method according to claim 51 wherein the first and second guide members are biased by one or more springs.

\* \* \* \* \*